US012768229B2

(12) United States Patent
Hoffos

(10) Patent No.: US 12,768,229 B2
(45) Date of Patent: Oct. 20, 2026

(54) ROBOTIC CASING STABBING GUIDE

(71) Applicant: Kelsey Leroy Hoffos, Laglace (CA)

(72) Inventor: Kelsey Leroy Hoffos, Laglace (CA)

( * ) Notice: Subject to any disclaimer, the term of this patent is extended or adjusted under 35 U.S.C. 154(b) by 0 days.

(21) Appl. No.: 19/066,246

(22) Filed: Feb. 28, 2025

(65) Prior Publication Data

US 2025/0277415 A1 Sep. 4, 2025

Related U.S. Application Data

(60) Provisional application No. 63/559,981, filed on Mar. 1, 2024.

(51) Int. Cl.

| | |
|---|---|
| ***E21B 19/24*** | (2006.01) |
| ***B25J 9/00*** | (2006.01) |
| ***E21B 19/16*** | (2006.01) |

(52) U.S. Cl.

CPC ............. *E21B 19/24* (2013.01); *B25J 9/0009* (2013.01); *E21B 19/16* (2013.01); *E21B 19/165* (2013.01)

(58) Field of Classification Search

CPC ........ E21B 19/24; E21B 19/16; E21B 19/165; B25J 9/0009

See application file for complete search history.

(56) References Cited

U.S. PATENT DOCUMENTS

| | | | | |
|---|---|---|---|---|
| 3,576,062 A * | 4/1971 | Matherne | E21B 19/16 29/281.6 |
| 8,534,386 B2 | 9/2013 | Ge | |
| 8,550,174 B1 * | 10/2013 | Orgeron | E21B 19/24 166/380 |
| 10,941,617 B2 | 3/2021 | Benchikh et al. | |
| 11,702,894 B2 | 7/2023 | Holck | |
| 2006/0113075 A1 * | 6/2006 | Springett | E21B 33/068 166/380 |
| 2009/0038857 A1 * | 2/2009 | Hamilton | E21B 19/16 175/85 |
| 2009/0053014 A1 * | 2/2009 | Ge | E21B 19/161 414/22.61 |
| 2011/0103922 A1 * | 5/2011 | Belik | E21B 19/155 414/22.58 |
| 2015/0354297 A1 * | 12/2015 | Arp | E21B 19/24 166/77.51 |
| 2016/0186510 A1 * | 6/2016 | Vestersjo | E21B 19/00 166/380 |

(Continued)

OTHER PUBLICATIONS

Nternational Search Report and Written Opinion of the International Searching Authority, International Application No. PCT/CA2025/050270 date of mailing: May 9, 2025 (May 9, 2025).

*Primary Examiner* — Neel Girish Patel
(74) *Attorney, Agent, or Firm* — Amburn Law PLLC; Dean W. Amburn

(57) ABSTRACT

A robotic casing or pipe stabbing guide for oil and gas well drilling includes a mount adapted to connect to a robotic arm, a main body, arms, casing guides, shoes and springs biasing the arms in a closed position around a casing guide. The casing or pipe guide includes a portion adapted to hold a box end of a tubular and a portion adapted to align and direct a pin-end of a second tubular into the box end of the first tubular. The arms are then moved outwardly away from the first and second tubular thus allowing for easy release. The main body assembly includes a tri-guide design adapted to better grip and control the tubular during the mounting of the second tubular.

14 Claims, 46 Drawing Sheets

(56) References Cited

U.S. PATENT DOCUMENTS

| | | | | |
|---|---|---|---|---|
| 2017/0204686 | A1* | 7/2017 | Harshbarger | E21B 19/06 |
| 2019/0277100 | A1* | 9/2019 | Thiemann | E21B 19/165 |
| 2022/0065054 | A1* | 3/2022 | Mikalsen | E21B 19/24 |
| 2023/0003090 | A1* | 1/2023 | Saunders | E21B 19/24 |
| 2023/0073941 | A1 | 3/2023 | De Mul et al. | |

* cited by examiner

ROBOTIC CASING STABBING GUIDE

TECHNICAL FIELD

The invention generally relates to oil and gas drilling rig equipment and more particularly to equipment used on robotic assisted drilling rigs to assist in guiding pipe when installing joints of pipe into the oil or gas well bores.

BACKGROUND

Generally, a stabbing guide is a two-piece construction hand operated tool used in the oil and gas industry to help operators align two separate sections of drill pipe, tubing, or casing for male-to-female connections. The two-piece construction of the stabbing guide is a limitation that can interfere with its effective operation. Using the right stabbing guide is the way to prevent pipe and thread damage and minimize potential connection failure and missed stabbing procedures. A good stabbing guide will help operators save time and ensure no thread damage while stabbing.

When a pipe is mis-stabbed, downtime increases, and there is potential damage to the thread connection. To help increase efficiency and reduce risk to operators, robotic casing stabbing guides were developed for the oil and gas well drilling industry for a semi-autonomous drilling rig. However, robotic systems have their own limitations and do not properly operate in all conditions. The use of robotic arms on a drilling rig's floor prevents workers from entering onto the floor to install and remove casing guides between each casing segment on the rig.

In well drilling, specifically oil and gas well drilling, conventional casing operations typically involve specialized crews and equipment that are brought to a rig site for the purpose of running the casing. The casing crew rigs tools and operates the equipment, connecting each joint of casing to be lowered into the wellbore. The driller who operates the topdrive will use a stab-in procedure of the casing running tools. The use of stabbing guides into each joint of the box end on the casing is done to help entry, but the use of sensors on the drilling platform halts operation when a person sets foot on the rig's floor. As a result, manual use of stabbing guides is unavailable. The use of alternatives would make this process more efficient.

A solution is needed that is capable of operating in harsh weather conditions such as in −40° C. weather. The solution must interface with the onboard robotic end effector and be devoid of hydraulic and electrical systems. The solution needs to adapt to the different casing sizes including casing diameters, allow for mounting a doping unit, allow dope and steam to be sprayed on the casing during operation, and for the robotic manipulator to remove the solution from around the casing after connection.

SUMMARY

It is an objective of the invention to offer a solution to the above-described problems. The invention offers a better solution in a robotic environment to allow oil or gas well rig operators to align two separate sections of drill pipe, tubing, or casing for male-to-female connections. It should be understood that although reference is frequently given to using the invention with oil or gas well casings, the invention is intended to be used with drill pipe, tubing, or casings. The invention will work with robotic systems including fully-automated advanced system robotics for performing a variety of tasks and improving a rig's performance. With the use of robotics and the removal of personnel on a rig floor there is a need for this invention.

In a nonlimiting embodiment, the robotic stabbing guide of the invention is constructed of three pieces, for a smaller footprint used to help align 9⅝ inch to 2⅜ inch pipe and protect the thread and sealing area of the connection. The stabbing guide of the invention can be bolted onto any rig that uses robotic assisted pipe handlers.

In a nonlimiting embodiment of the invention, a robotic casing stabbing guide for oil and gas well drilling, includes a mount, adapted to connect to a robotic arm, and a main body associated with the mount, centering springs. The main body includes a cylindrical casing guide including a top portion having an inwardly angled surface relative to an axis passing through the center of the cylindrical casing guide, and a bottom portion having an inner surface colinear with the axis. The main body also includes a first and second arm in pivoting association with the main body wherein the first and second arm are biased into a closed position by at least one biasing element, wherein the first arm biases a first section of the cylindrical casing guide and the second arm biases a second section of the cylindrical casing guide, wherein the first arm includes a first shoe portion curved and extending outwardly away from the cylindrical casing guide, wherein the second arm includes a second shoe portion curved and extending outwardly away from the cylindrical casing guide.

In a nonlimiting embodiment of the robotic casing stabbing guide the cylindrical casing guide is in three segments. In another nonlimiting embodiment the three segments are each 120° about the axis.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1A:
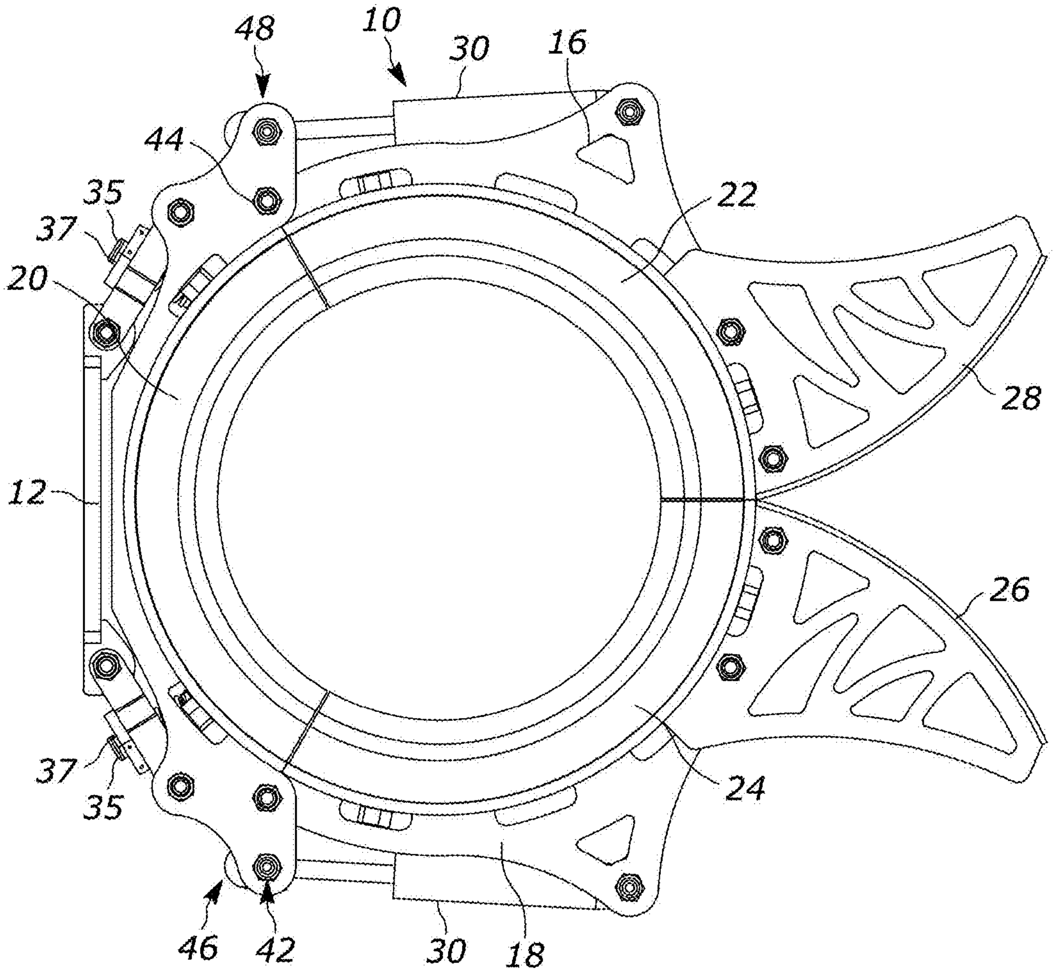
FIG. 1A is a top plan view of a nonlimiting embodiment of a robotic casing stabbing guide apparatus of the invention.
Figure 1B:
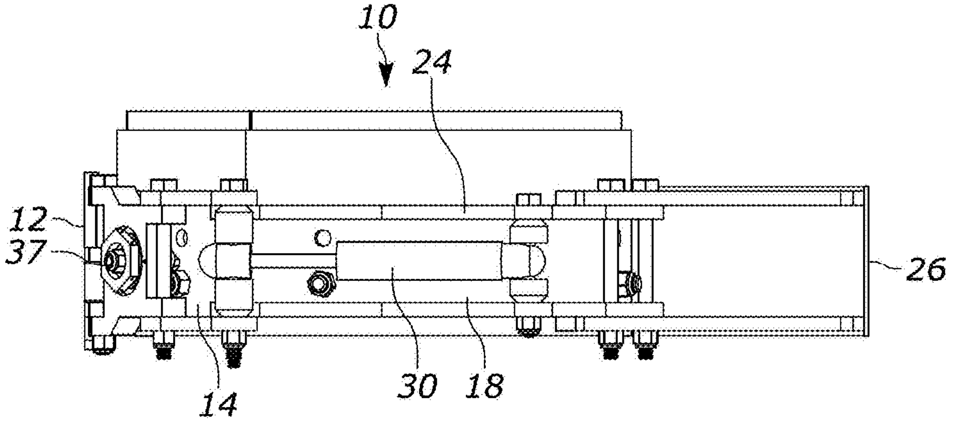
FIG. 1B is a side plan view of the apparatus of FIG. 1A.
Figure 1C:
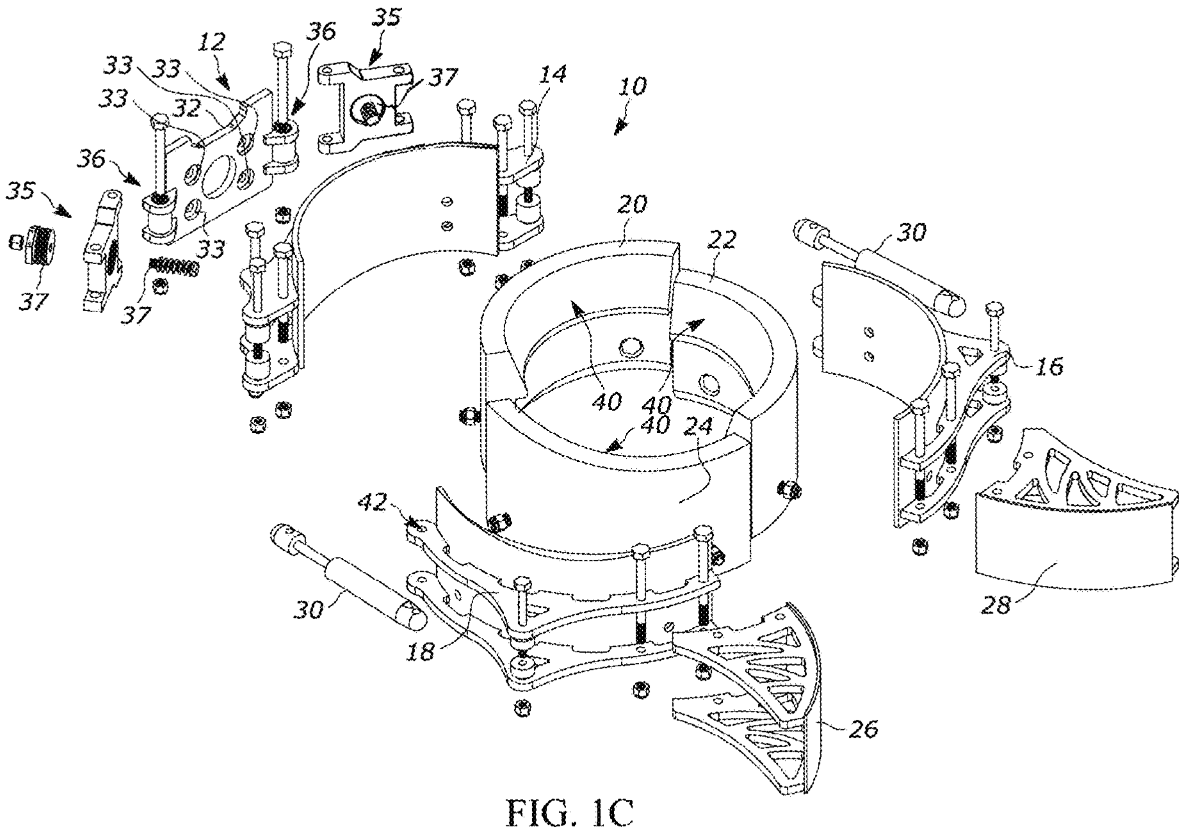
FIG. 1C is an exploded view of the apparatus of FIG. 1A.
Figure 1D:
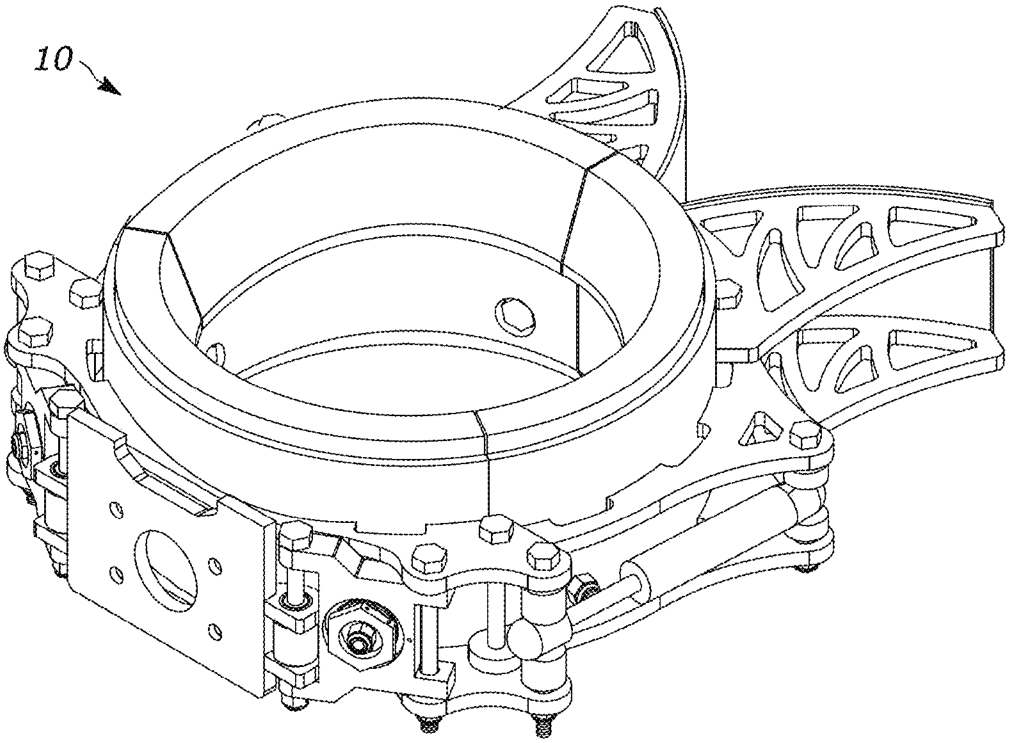
FIG. 1D is a rear perspective view of the apparatus of FIG. 1A.
Figure 2A:
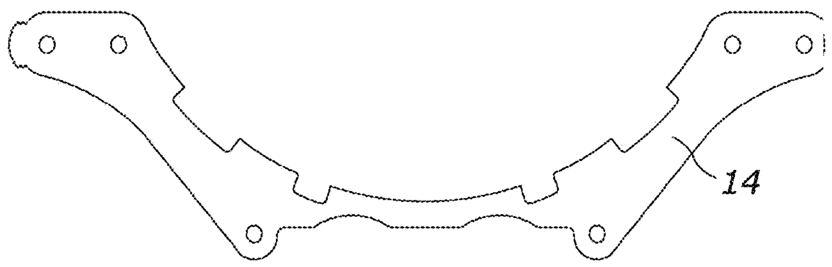
FIGS. 2A-2B are plan views of a part of the apparatus of FIG. 1A, or an embodiment thereof.
Figure 2B:
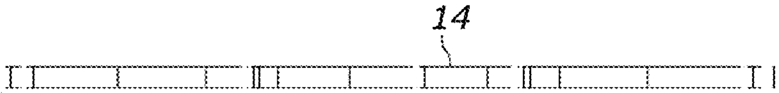
Figure 3A:
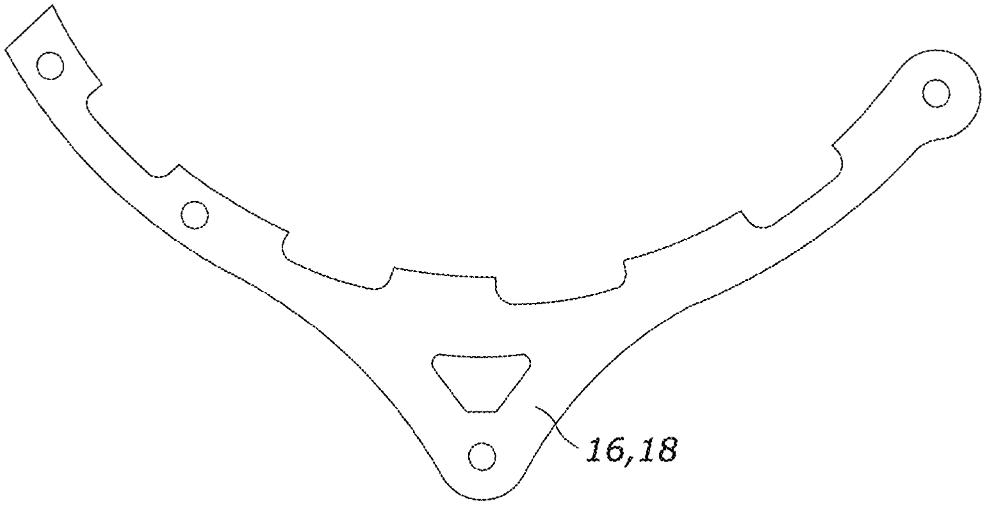
FIGS. 3A-3B are plan views of a part of the apparatus of FIG. 1A, or an embodiment thereof.
Figure 3B:
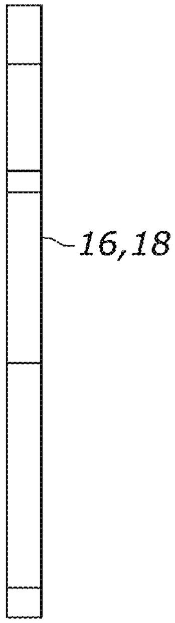
Figure 4A:
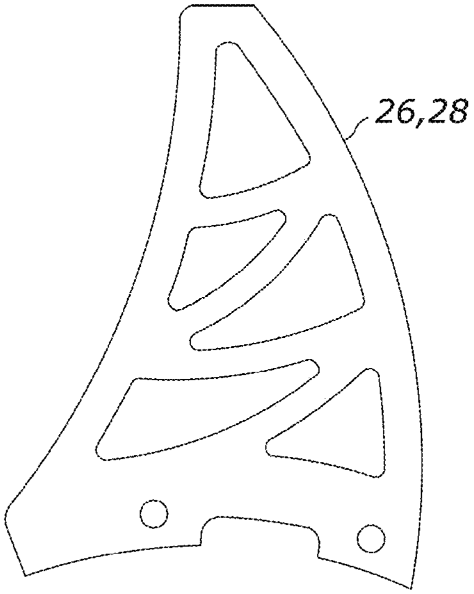
FIGS. 4A-4B are plan views of a part of the apparatus of FIG. 1A, or an embodiment thereof.
Figure 4B:
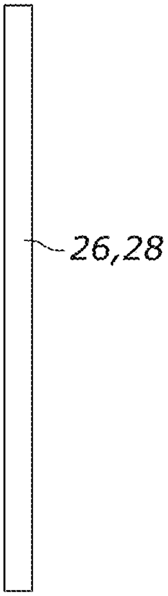
Figure 5A:
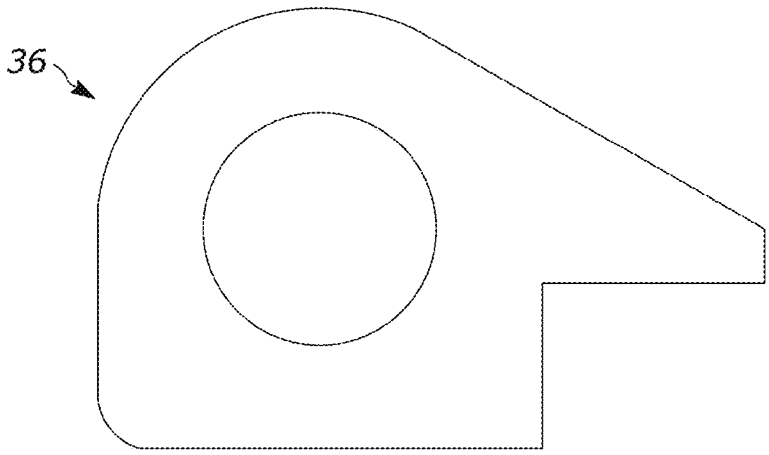
FIGS. 5A-5B are plan views of a part of the apparatus of FIG. 1A, or an embodiment thereof.
Figure 5B:
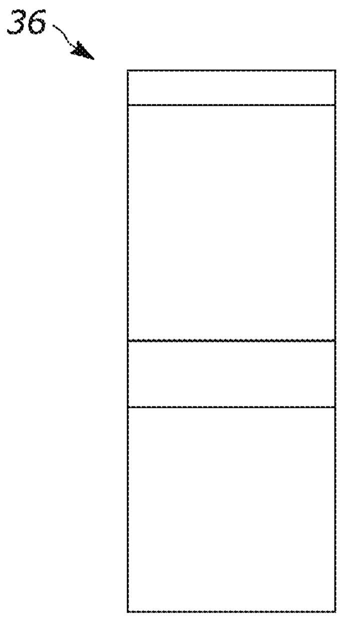
Figure 6A:
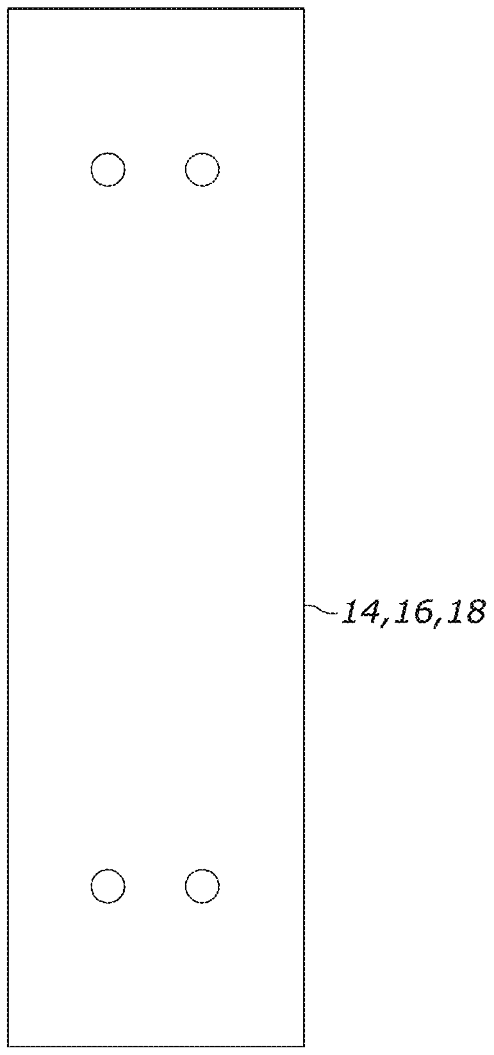
FIGS. 6A-6C are plan views of a part of the apparatus of FIG. 1A, or an embodiment thereof.
Figure 6B:
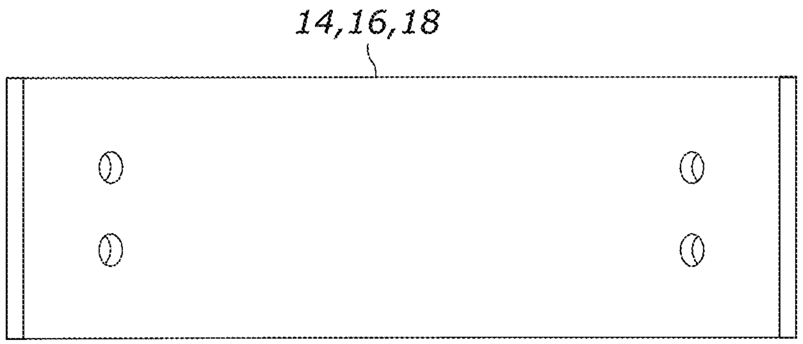
Figure 6C:
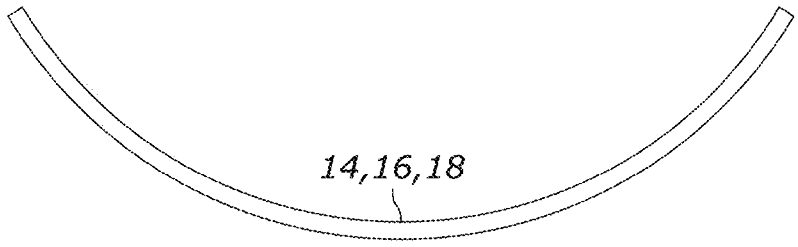
Figure 7A:
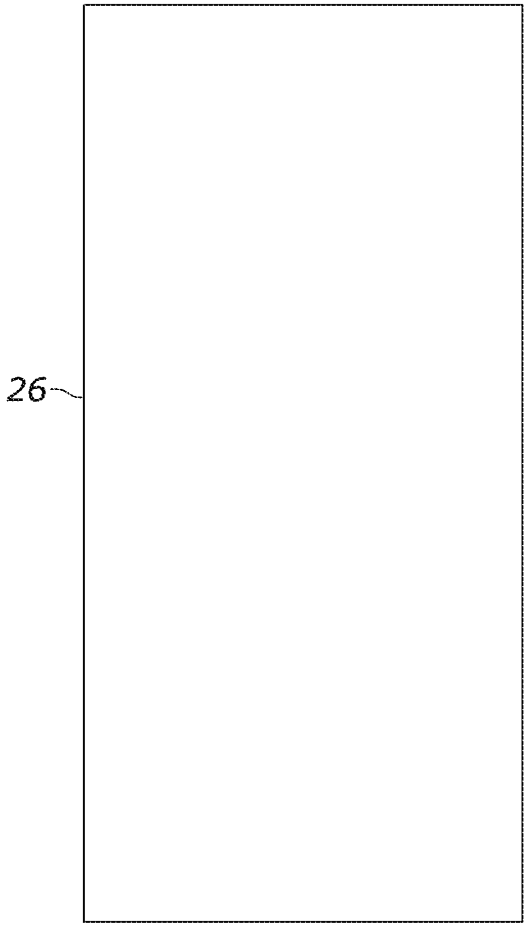
FIGS. 7A-7C are plan views of a part of the apparatus of FIG. 1A, or an embodiment thereof.
Figure 7B:
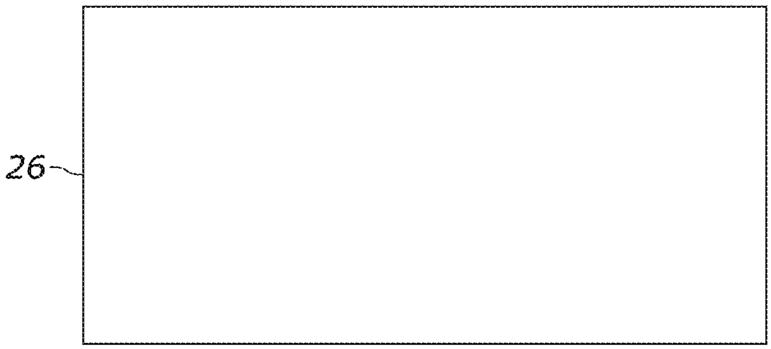
Figure 7C:
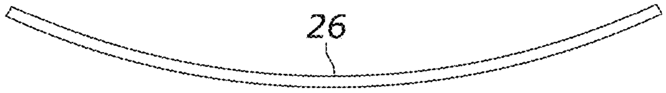
Figure 8A:
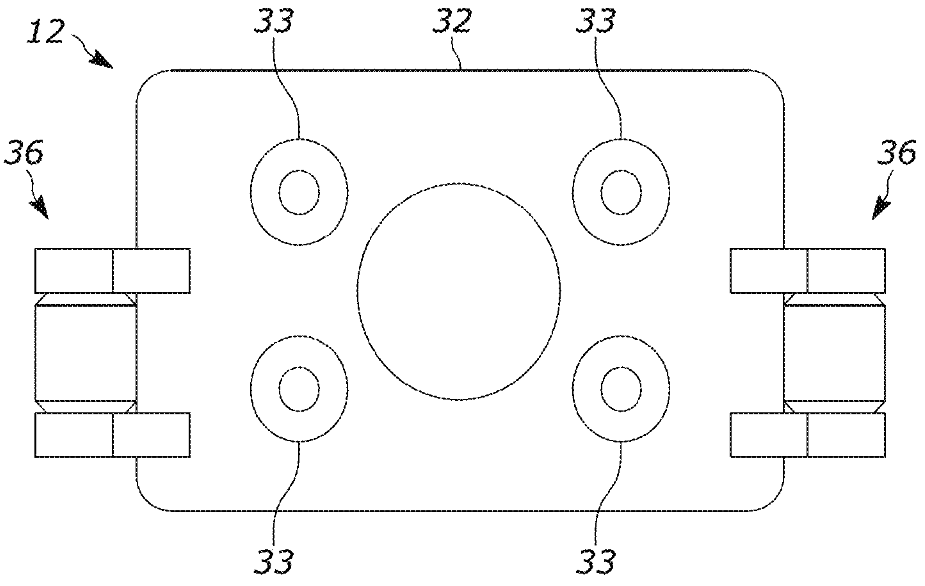
FIGS. 8A-8C are plan views of a part of the apparatus of FIG. 1A, or an embodiment thereof.
Figure 8B:
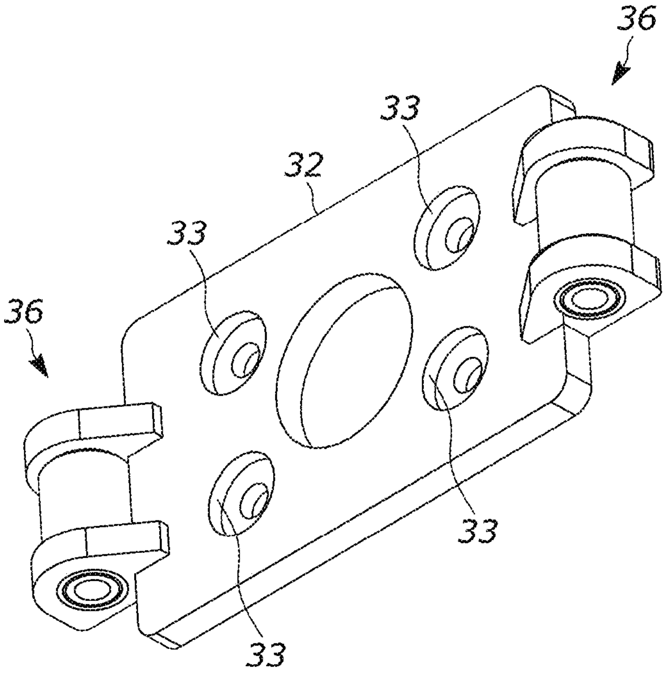
Figure 8C:
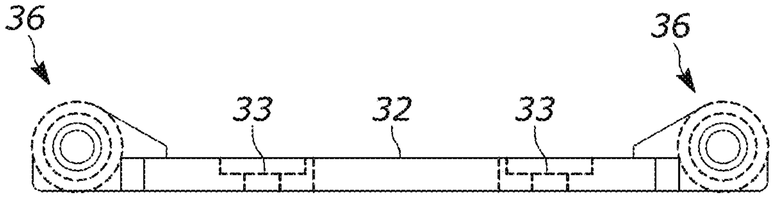
Figure 9A:
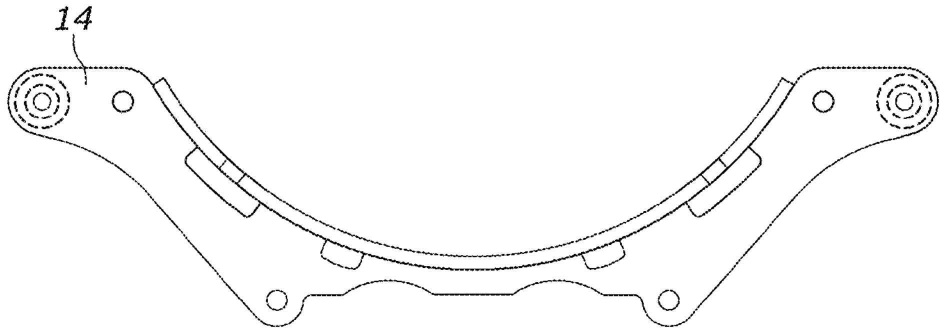
FIGS. 9A-9C are plan views of a part of the apparatus of FIG. 1A, or an embodiment thereof.
Figure 9B:
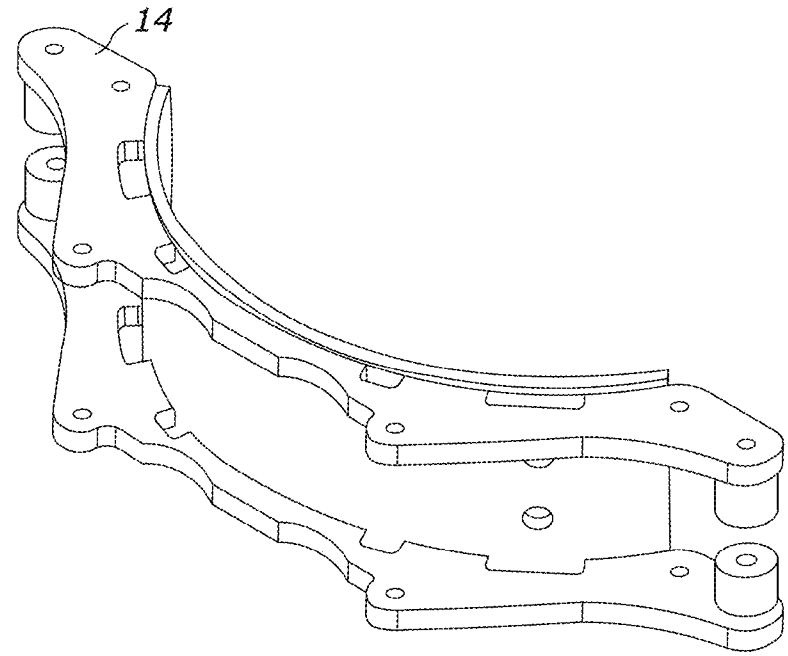
Figure 9C:
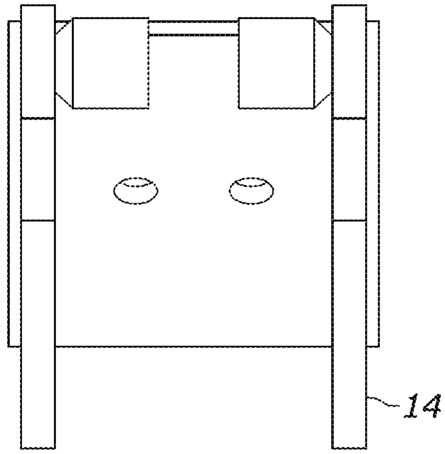
Figure 10A:
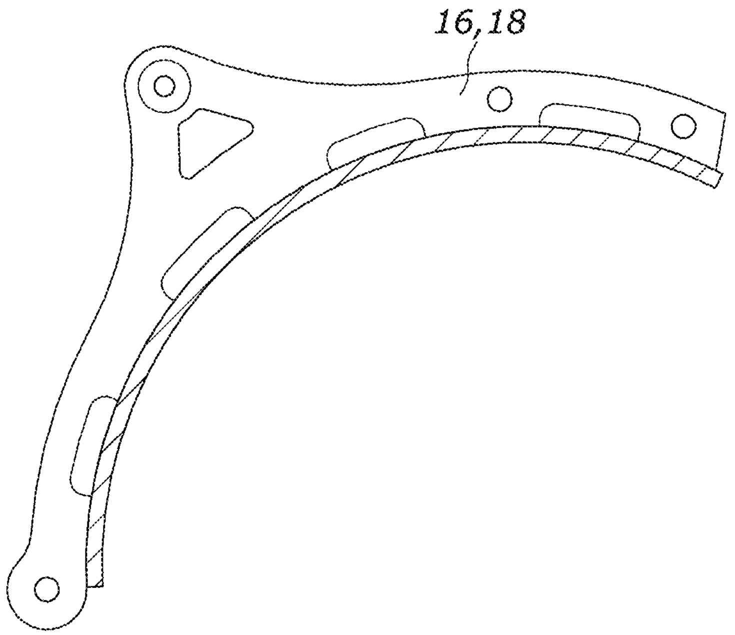
FIGS. 10A-10C are plan views of a part of the apparatus of FIG. 1A, or an embodiment thereof.
Figure 10B:
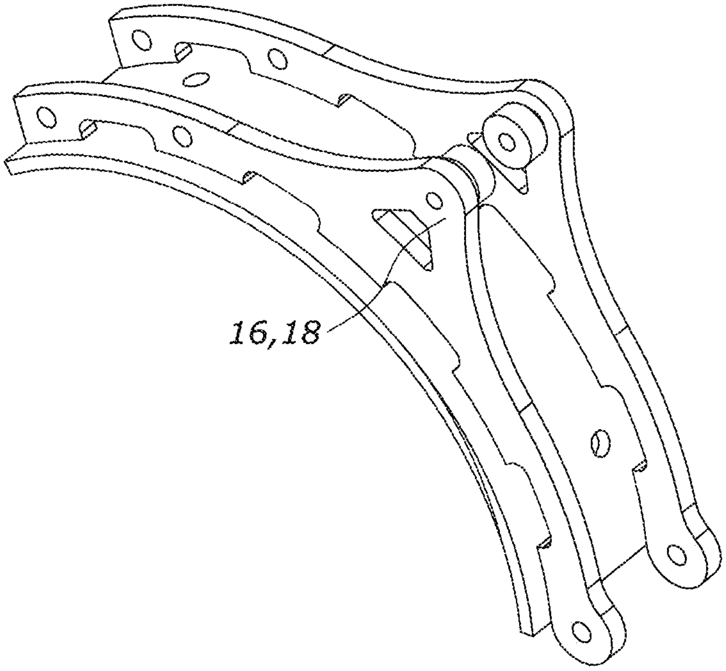
Figure 10C:
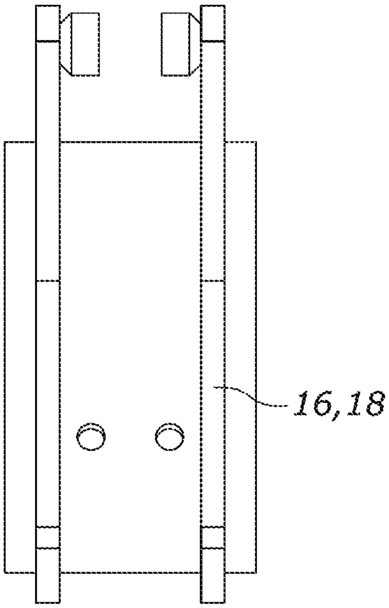
Figure 11A:
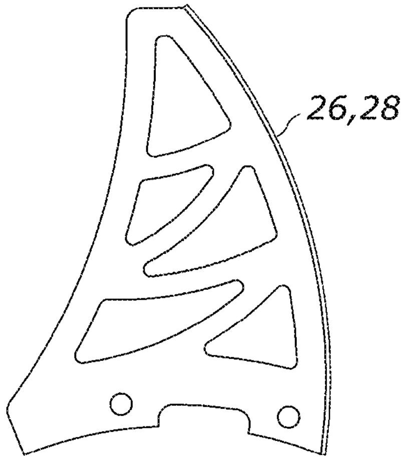
FIGS. 11A-11C are plan views of a part of the apparatus of FIG. 1A, or an embodiment thereof.
Figure 11B:
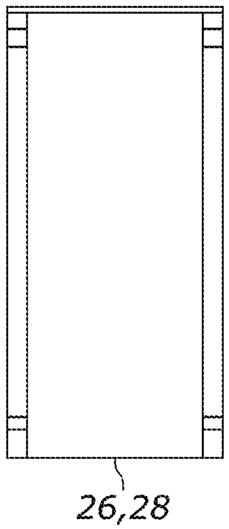
Figure 11C:
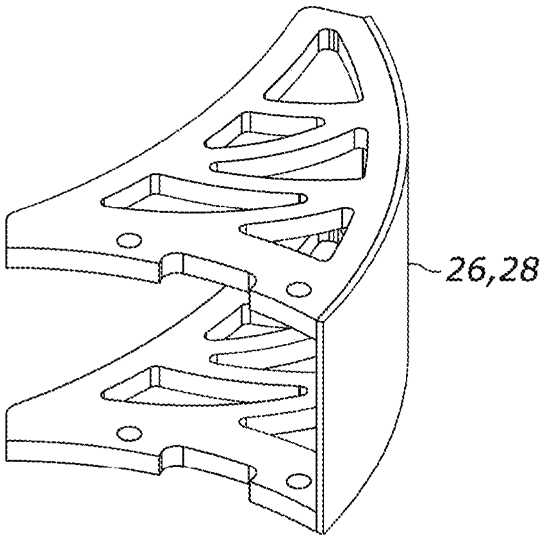
Figure 12A:
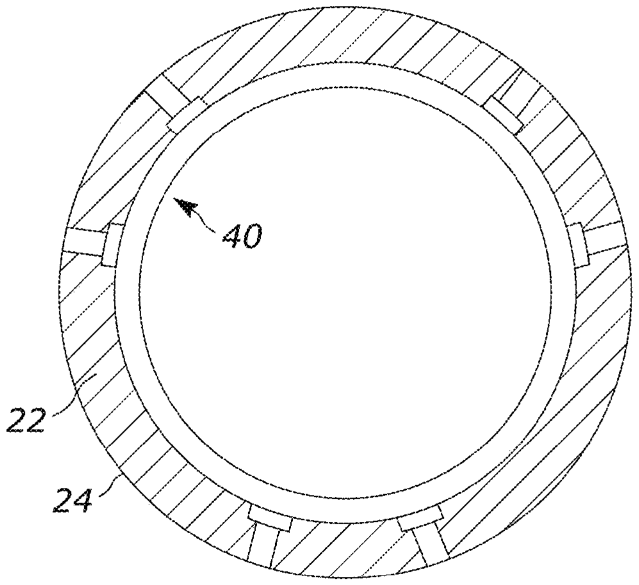
FIGS. 12A-12D are plan views of a part of the apparatus of FIG. 1A, or an embodiment thereof.
Figure 12B:
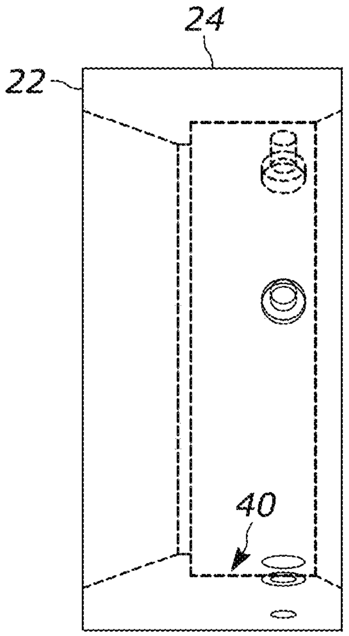
Figure 12C:
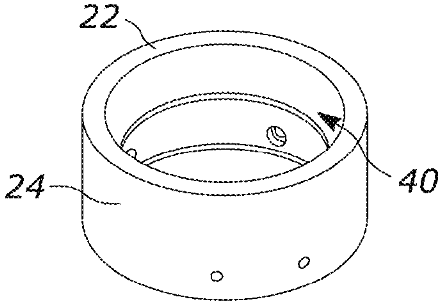
Figure 12D:
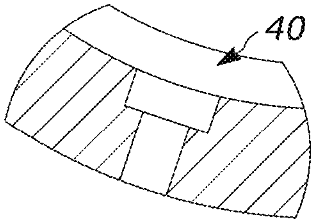
Figure 13A:
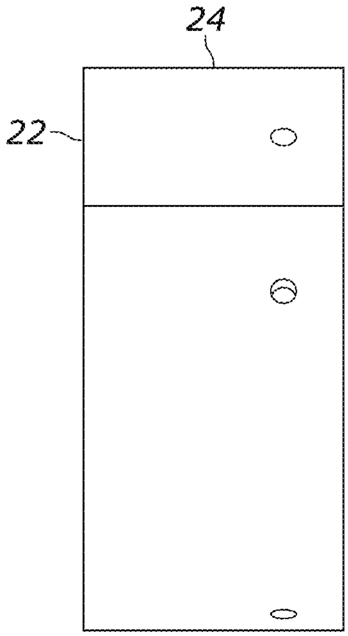
FIGS. 13A-13C are plan views of a part of the apparatus of FIG. 1A, or an embodiment thereof.
Figure 13B:
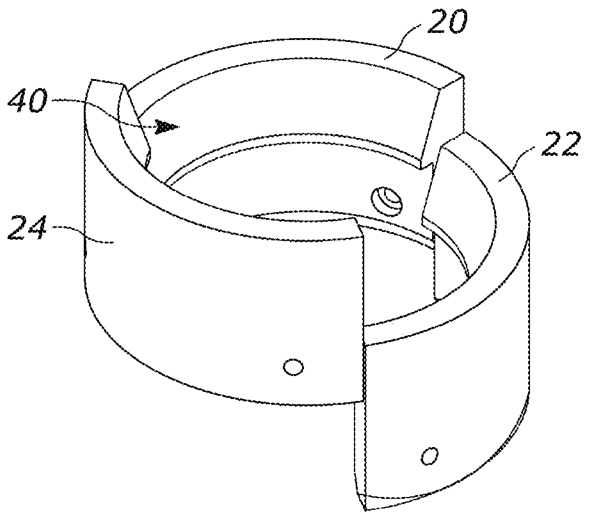
Figure 13C:
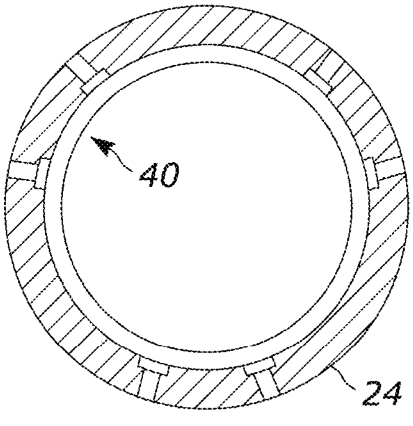
Figure 14A:
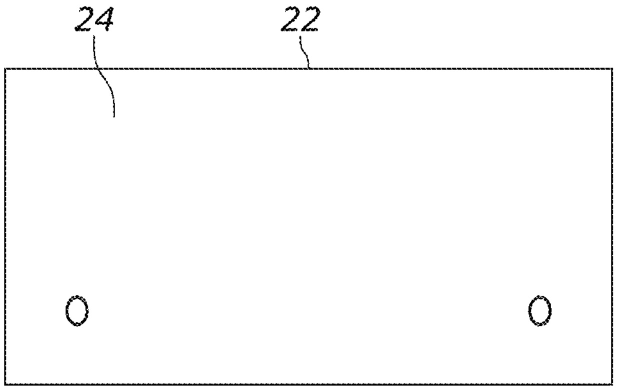
FIGS. 14A-14C are plan views of a part of the apparatus of FIG. 1A, or an embodiment thereof.
Figure 14B:
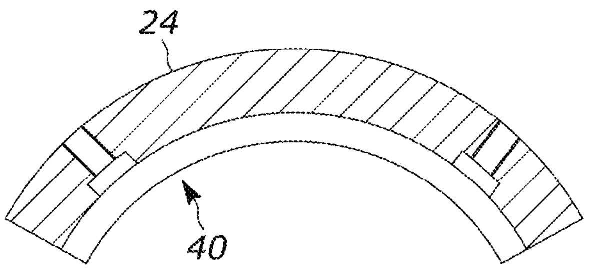
Figure 14C:
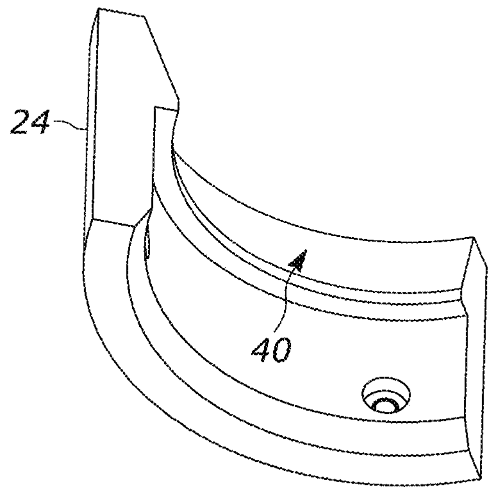
Figure 15A:
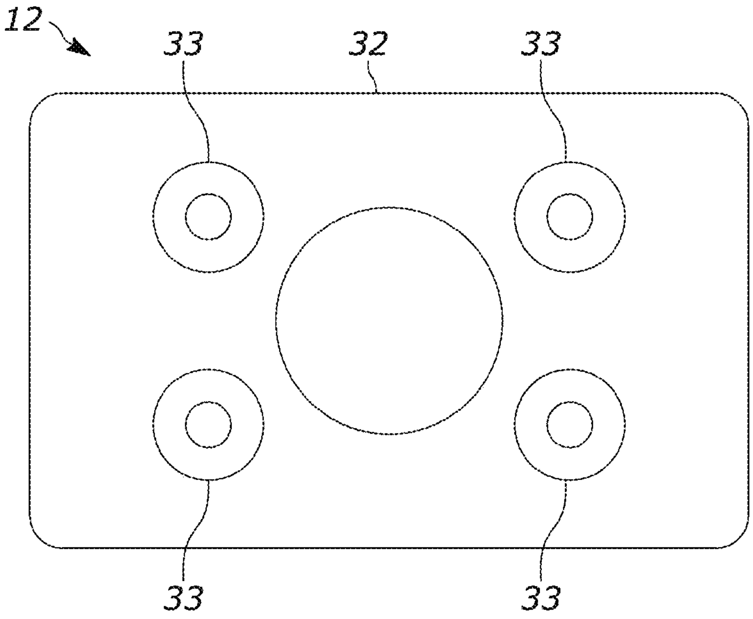
FIGS. 15A-15C are plan views of a part of the apparatus of FIG. 1A, or an embodiment thereof.
Figure 15B:
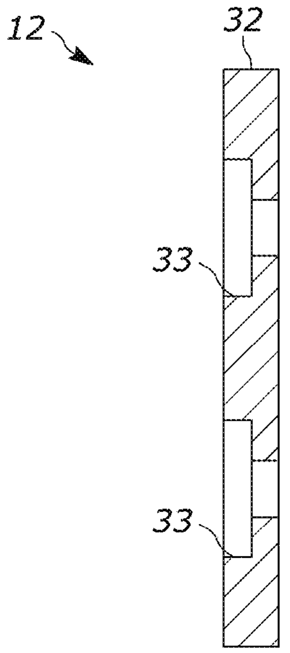
Figure 15C:
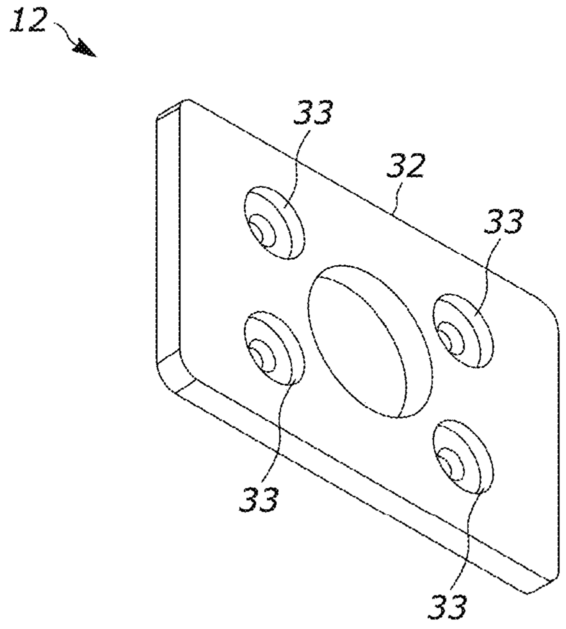
Figure 16A:
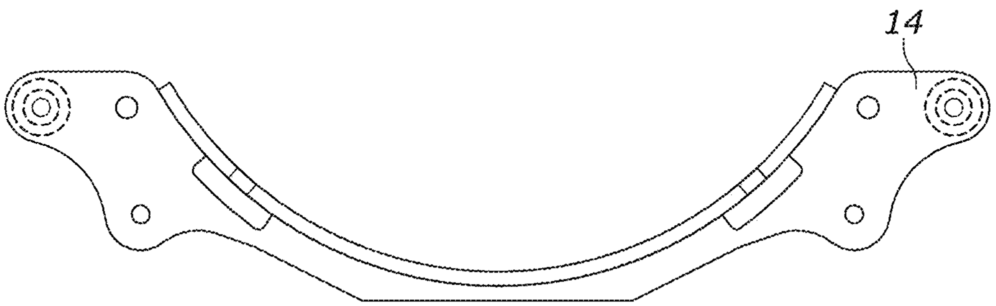
FIGS. 16A-16C are plan views of a part of the apparatus of FIG. 1A, or an embodiment thereof.
Figure 16B:
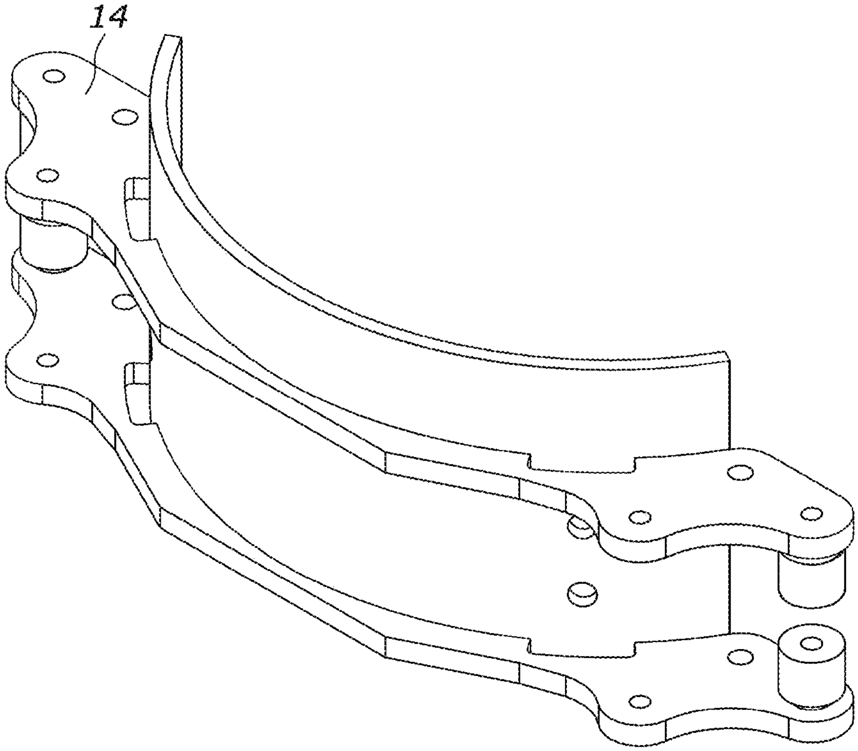
Figure 16C:
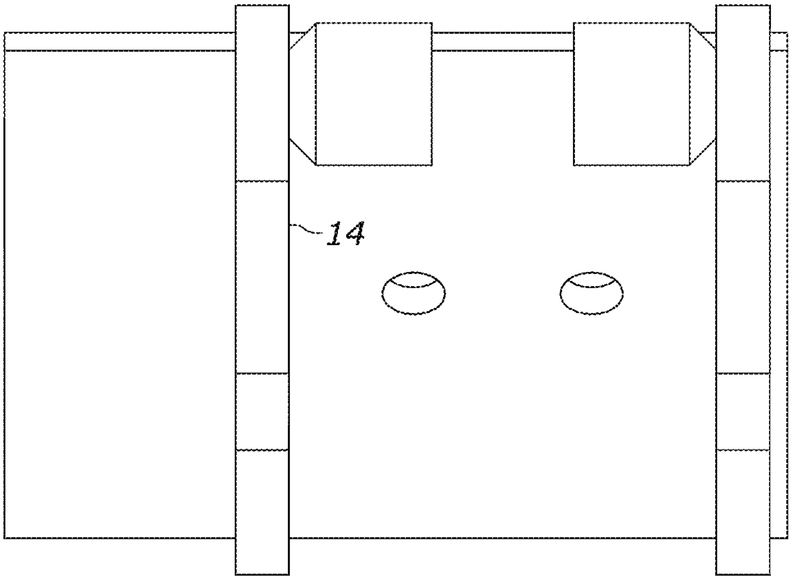
Figure 17A:
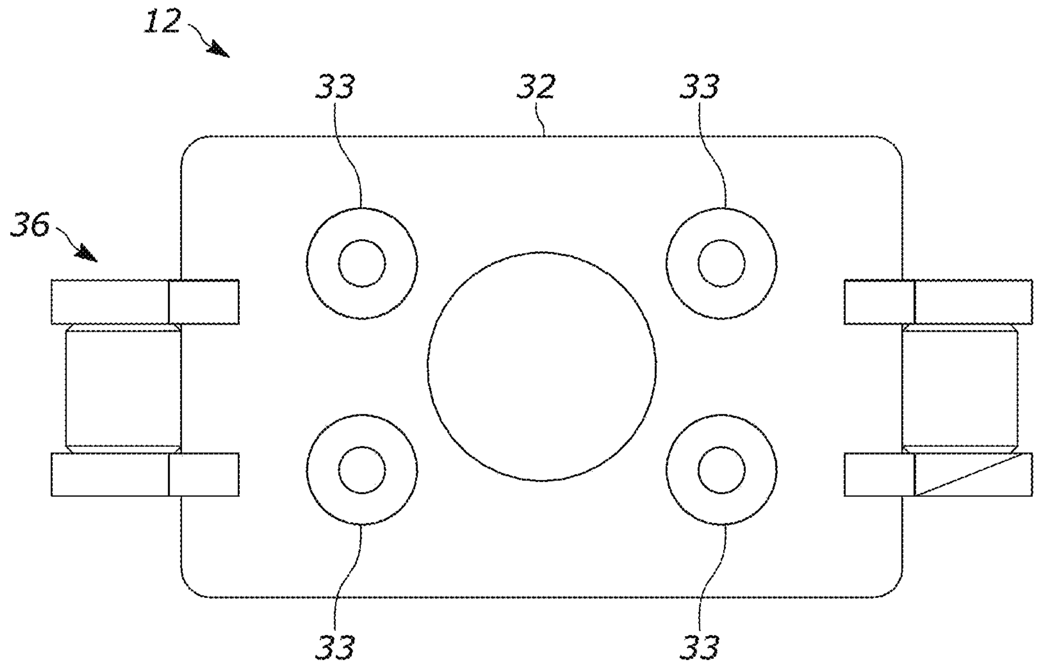
FIGS. 17A-17C are plan views of a part of the apparatus of FIG. 1A, or an embodiment thereof.
Figure 17B:
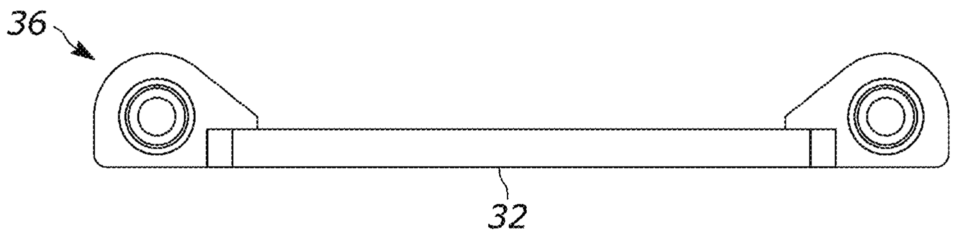
Figure 17C:
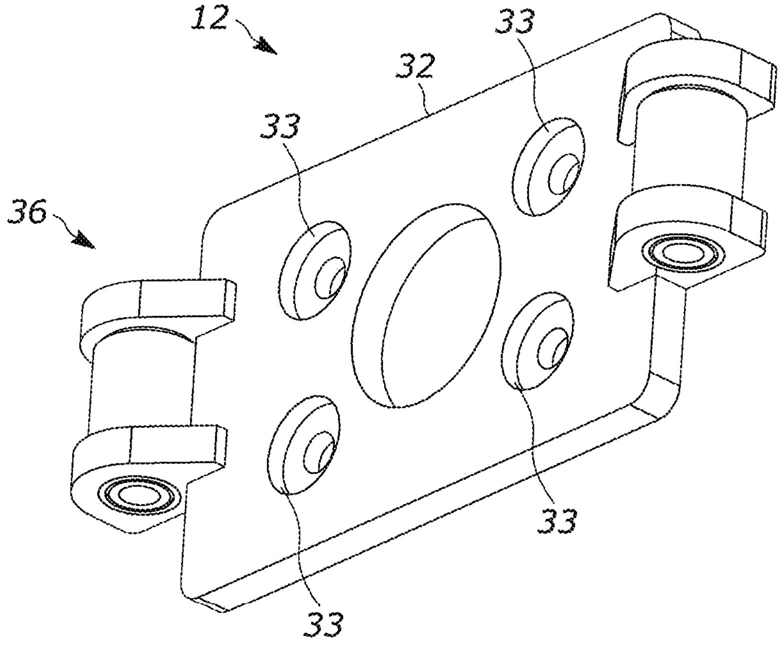
Figure 18A:
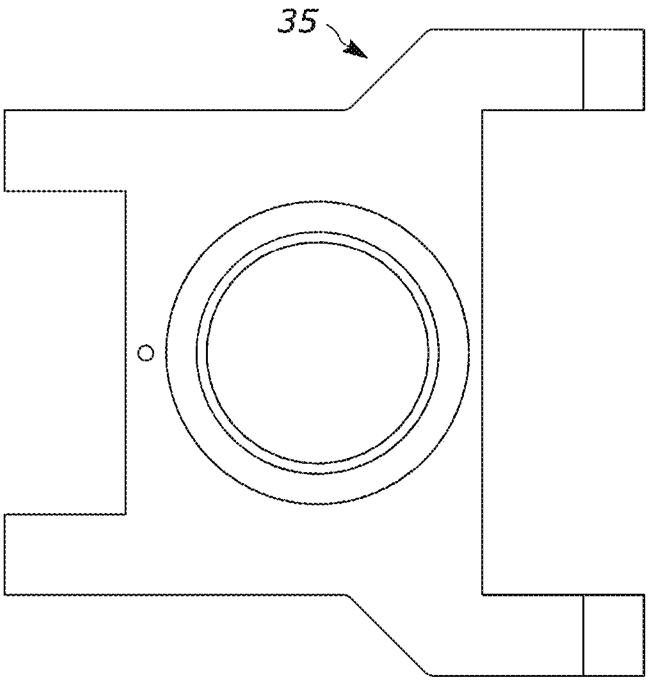
FIGS. 18A-18D are plan views of a part of the apparatus of FIG. 1A, or an embodiment thereof.
Figure 18B:
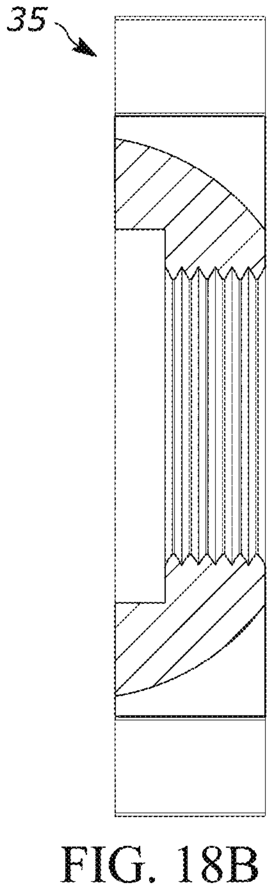
Figure 18C:
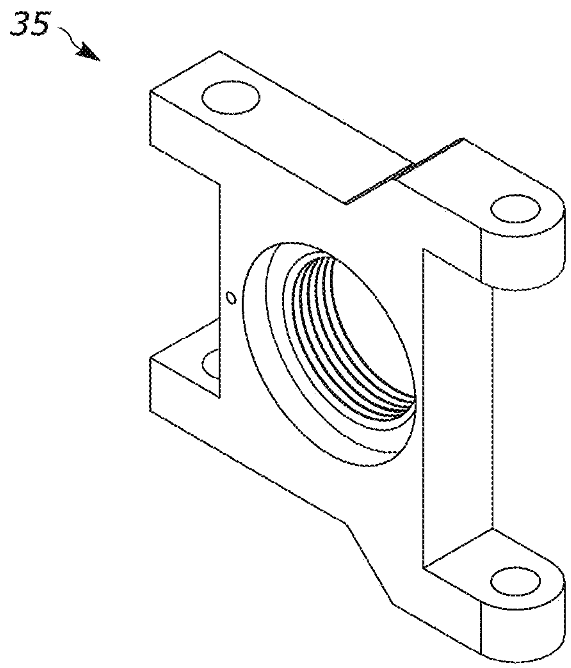
Figure 18D:
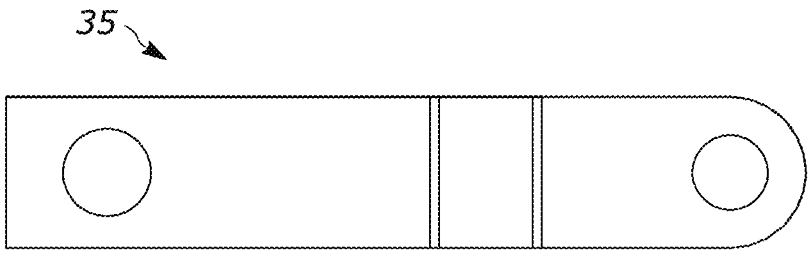
Figure 19A:
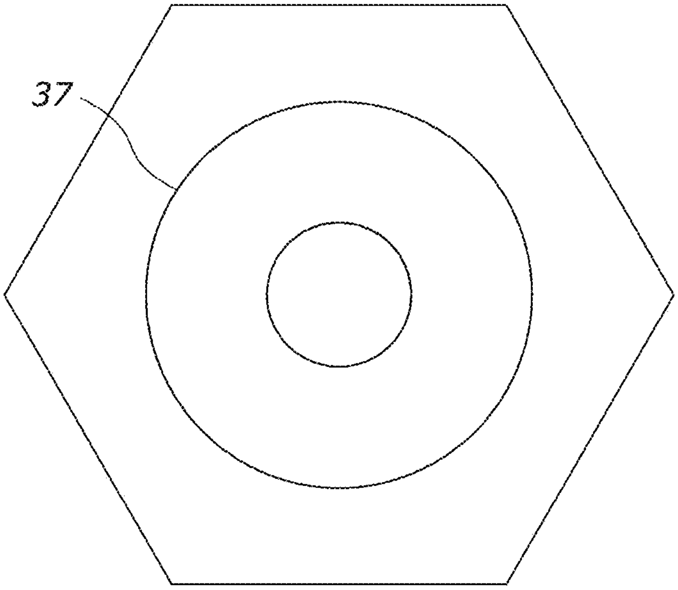
FIGS. 19A-19D are plan views of a part of the apparatus of FIG. 1A, or an embodiment thereof.
Figure 19B:
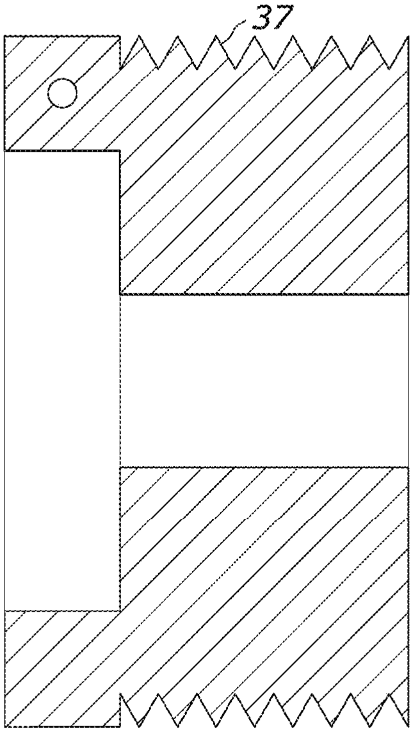
Figure 19C:
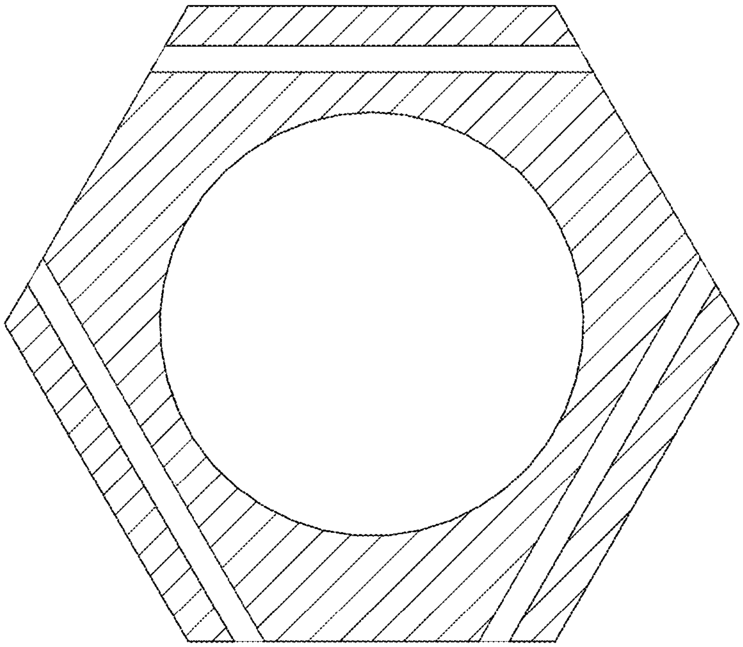
Figure 19D:
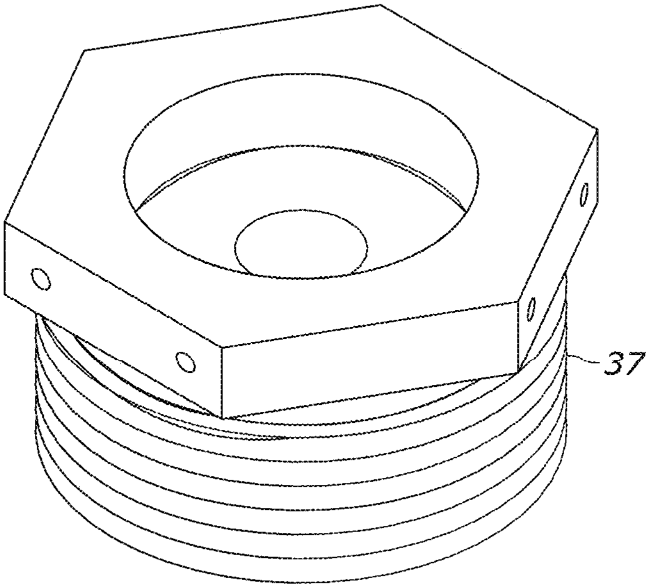
Figure 20A:
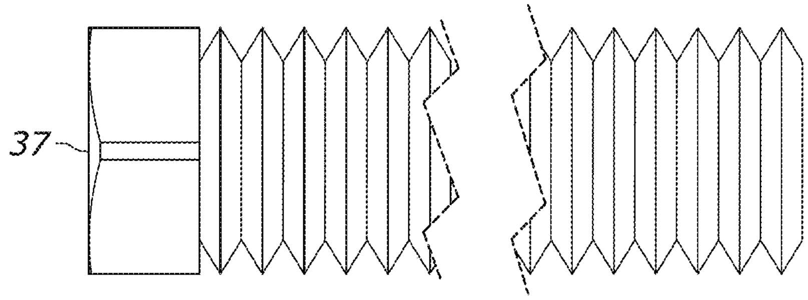
FIGS. 20A-20C are plan views of a part of the apparatus of FIG. 1A, or an embodiment thereof.
Figure 20B:
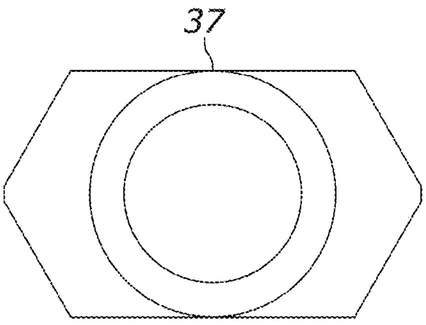
Figure 20C:
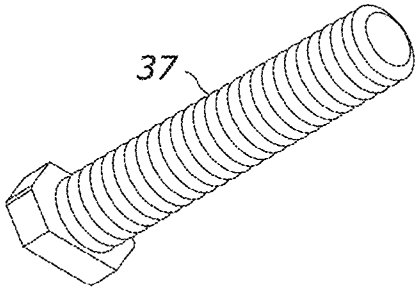

Referring to FIGS. 1-20, in a nonlimiting embodiment of the invention a robotic tubular stabbing guide 10, is a stabbing guide adapted to mount to a robotic arm end effector (not shown), with mounting points for a doper. Generally, a robotic end effector is a peripheral device that attaches to a robot's arm, allowing the robot to interact with its task. Robotic systems including robotic arm end effectors have recently been introduced in the gas and oil well drilling industry. The robotic tubular stabbing guide 10 is intended to be able to associate with any of the robotic systems used in the oil and gas well industry including their robotic arm end effectors.

The robotic tubular stabbing guide 10 includes a cylindrical polyurethane guide intended to rest on a previously installed length of a casing's box end. A top portion of the polyurethane guide is angled relative to an axis passing through the center of the cylindrical polyurethane guide. A bottom portion of the polyurethane guide is colinear with the axis. The bottom portion of the polyurethane guide holds the casing or pipe box end while the top portion of the polyurethane guide directs the pin end of the next joint of casing or pipe into the center of the box end. As the pin end enters the box end through the direction of the polyurethane guide, the polyurethane guide holds the pipe in its 360° circumference so that the pin end contacts and slides along the angled wall of the top portion of the polyurethane guide. Thus, the robotic tubular stabbing guide 10 keeps the tubular threads, shoulders, and seals from being damaged. Once a rigid connection is made, the robotic tubular stabbing guide 10 is capable of being pulled free from the casing by splitting along seams in its diameter. The three-piece design is used to keep the opening footprint to the smallest physical size. The robotic tubular stabbing guide 10 uses the force of the robotic arm to pull free from the casings/pipes. Springs along the RC-SG's robotic tubular stabbing guide's 10 joints keep the joints closed if the pipe is mis-stabbed and when not being pushed or pulled against the tubular diameter, including if the above joint had a missed stab. Shoes along the front of the robotic tubular stabbing guide 10 allow it to be opened by pressing against the diameter of the casing. Geometry directs the force of this interaction to optimally open the robotic tubular stabbing guide 10. The need to push this onto the pipe arises if the connection fails to make up properly and the joint must be broken out for thread inspection. The robotic tubular stabbing guide 10 also features some vertical travel to accommodate misalignment with the casing stump height relative to the robotic end effector.

The robotic tubular stabbing guide 10 consists of a mount 12 including a centering spring assembly, a main body assembly 14, a first arm assembly 16, a second arm assembly 18, a first casing guide, 20, a second casing guide 22, a third casing guide 24, a first shoe assembly 26, a second shoe assembly 28, and springs 30. The mount 12 includes a mounting plate 32 with a bolt pattern 34 adapted to interface with an end effector of a robotic arm, and two rails 36 slidably associated with a centering spring assembly 35, the centering spring assembly 35 being movably associated with the main body assembly 14. In a nonlimiting embodiment, the rails 36 are associated with the centering spring assembly 35 so that the main body assembly 14 may move vertically up and down along the rails 36 within a limited range of travel. The centering spring assembly 35 includes a bolt, spring and nut assembly 37 adapted to center and align the robotic tubular stabbing guide 10 as attached to a robotic arm to better grasp a pipe or casing being worked with in a stabbing process. It should be appreciated that the mount 12 and bolt pattern 34 are illustrative of a way to associate the robotic tubular stabbing guide 10 to the robotic end effector, it being understood that persons of ordinary skill in the art could use many different well-known ways of associating the robotic tubular stabbing guide 10 to the end effector.

The main body assembly 14 includes a tri-guide design 40, adapted to better grip and control a tubular during the mounting of a second tubular. The tri-guide design 40 includes the first casing guide 20, the second casing guide 22, and the third casing guide 24, that are adapted to pivot at the first pivot point 42 and a second pivot point 44. Thus, the first shoe assembly 26, the second shoe assembly 28, and springs 30 cooperatively allow the robotic tubular stabbing guide 10 to open. The tri-guide design 40 advantageously reduces the opening footprint of the tool, unlike a bifold or a two-piece design. The tri-guide design 40 is of a rounded plate shape that is 120 degrees of its total diameter. It includes a first hinge 46 and a second hinge 48 centered on the ends of the plate shape, where the first arm assembly 16, and the second arm assembly 18 mount. The plate shape of the tri-guide design 40 includes attachments for the springs 30 to mount from the main body assembly 14 to the first arm assembly 16, and the second arm assembly 18. The bolt patterns are of a universal type to the arms, which allows the casing and a doper assembly (not shown) to both attach to the assembly. The described assembly is mounted perpendicular to the axis of its diameter for rigidity and allows movement along the rails 36 that the mounting plate 12 slides in between.

The first arm assembly 16, and the second arm assembly 18 each make up the other 120 degrees of the total 360 degree diameter and are mirrored for interchangeability. The first arm assembly 16, and the second arm assembly 18 have bolt patterns, universal to the main body assembly 14, for mounting the shoe assemblies 26, 28 and the doper assembly, and also features the pivot points 46, 48 on one end, where it mounts to the main body assembly 14, the pivot points where the springs 30 mount, as well as holes for a guide to be installed on the front of each arm.

The tubular guides 20, 22, 24 sizes are 9⅝ to 2⅜ inches and are manufactured from a single cylindrical piece of material, which is cut into three 120-degree segments and features pairs of holes counterbored universally into each segment, with a metallic sleeve pressed in place to prevent the holes from distorting during use. The casing guide bolt pattern is universal to all guides which facilitates interchangeability in the robotic tubular stabbing guide 10.

The casing guides 26, 28 includes geometry that directs the force generated by pressing against a round surface of the casing guides 26, 28 perpendicular to the point of rotation of a tubular, thus allowing the jaws to open when a tubular is pressed against the casing guides 26, 28. The casing guides 26, 28 force open the arm assemblies 16, 18 and work in pairs.

The springs 30 are both resistant to cold and corrosion. The springs 30 maintain pressure on the arm assemblies 16, 18 and main body assembly 14, thus keeping the robotic tubular stabbing guide 10 closed. The springs 30 are each a compression style spring.

In operation, the robotic tubular stabbing guide 10 includes three steps to its movement. First, the robotic arm while associated with the robotic tubular stabbing guide 10, positions the robotic tubular stabbing guide 10 above a casing's/pipe's box end, and is lowered until it makes contact with the tubular. Depending on the vertical position of the tubular, the robotic tubular stabbing guide 10 will accommodate some vertical deviation. In the next step, the gas or oil rig lowers a next section of tubular downward, and the tubular guides 20, 22, 24 direct the second casing's/pipe's pin-end to the center of the box-end of the first tubular. The springs 30 keep the first arm assembly 16, and the second arm assembly 18 of the robotic tubular stabbing guide 10 from opening when the tubular brushes against their sides or is mis-stabbed. If a doper is installed, it would then spray dope along the tubular as it is lowered into position. In a third step, the robotic arm pulls the robotic tubular stabbing guide 10 away from the joint of the first tubular and second tubular and the robotic tubular stabbing guide 10 closes using its springs 30. An optional fourth step includes pulling the tubular from the wellbore. In this optional step, the robotic tubular stabbing guide 10 is pushed onto the tubular via use of the casing guides 26, 28 (shoes) to force open the arm assemblies 16, 18. The force would open up the guide to a point where the pipe will fit into its center. The robotic tubular stabbing guide 10 will close from the spring tension 30. Once the tubular joint is backed out or unthreaded, the tubular will be lifted out and removed. The robotic tubular stabbing guide 10 will be lifted and removed so the next tubular can be lifted out of the bore hole.

The robotic tubular stabbing guide 10 is made of 3 materials, including 44W-50W steel, 1018 steel, and REDCO 750 polyurethane. It should be appreciated that other suitable materials may be used. The robotic tubular stabbing guide 10, except the casing guides 20, 22, 24 are made of 44W-50W and 1018 steel, due to its material characteristics and availability.

The casing guide 20, 22, 24 are made of Redco 750 polyurethane. It was chosen because of its abrasion resistance, hardness, temperature rating to −57° c., along with oil, grease, and chemical resistance.

The robotic tubular stabbing guide 10 was made with the future of the gas and oil well drilling industry in mind. Considerations were made for adaptability, interchangeability, and ease of assembly. The mounting points universally positioned on the main body and arms allow the rapid design and manufacture of components to complement the robotic tubular stabbing guide 10. Where possible, off the shelf parts were sourced to reduce lead time and build upon established systems.

The casing guide likewise uses an easily replicable bolt pattern for installation, thus allowing for the rapid design and installation of casing guides for different diameter casings.

This robotic tubular stabbing guide 10 is specifically suitable for oil rig use in the conditions: where workers cannot be present on the deck; the hydraulics are saturated; sub-zero climates; a need to allow the precise alignment of casing lengths with each other; and subsequent retraction once the pipe section is connected. The robotic tubular stabbing guide 10 will operate without outside intervention and is resistant to high cycle rates, corrosion, and cold weather while operating.

Figure 21A:
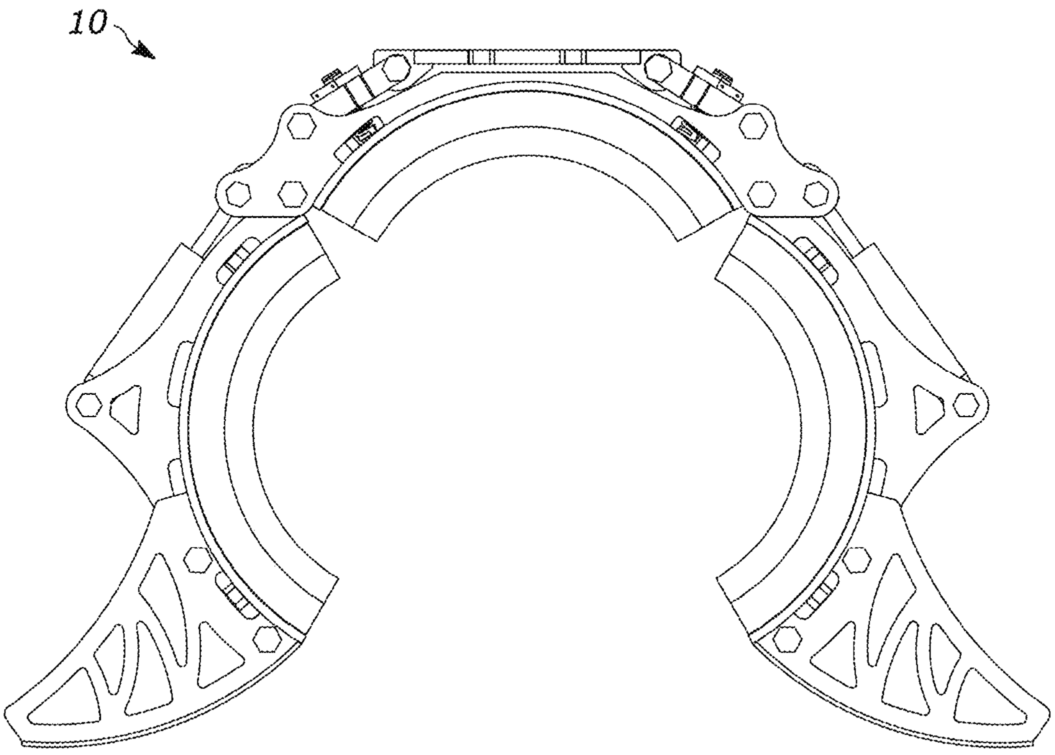
FIG. 21A is a top view of the apparatus of FIG. 1A in an open configuration.
Figure 21B:
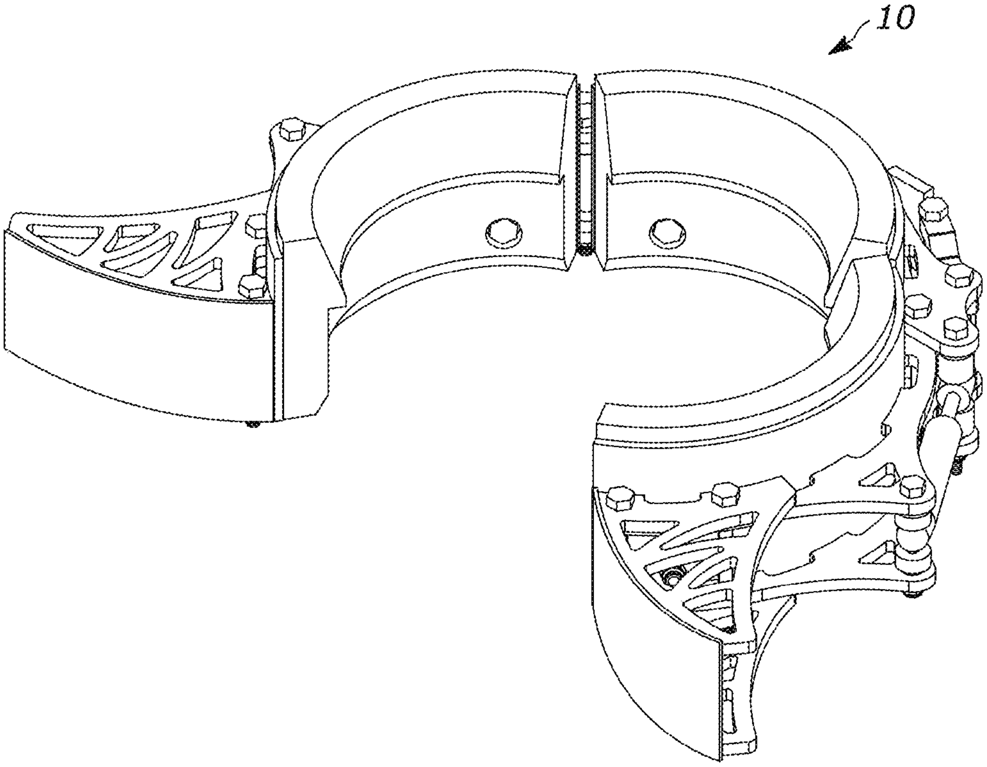
FIG. 21B is a front perspective view of the apparatus of FIG. 1A in an open configuration.
Figure 21C:
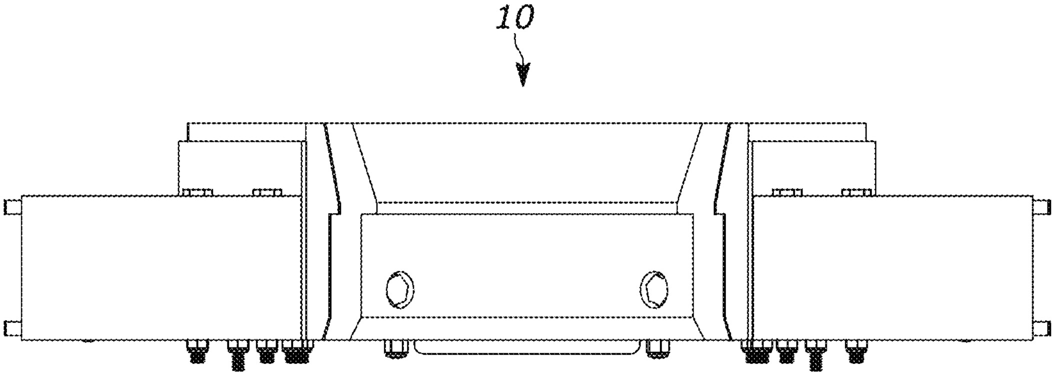
FIG. 21C is a rear view of the apparatus of FIG. 1A in an open configuration.
Figure 22A:
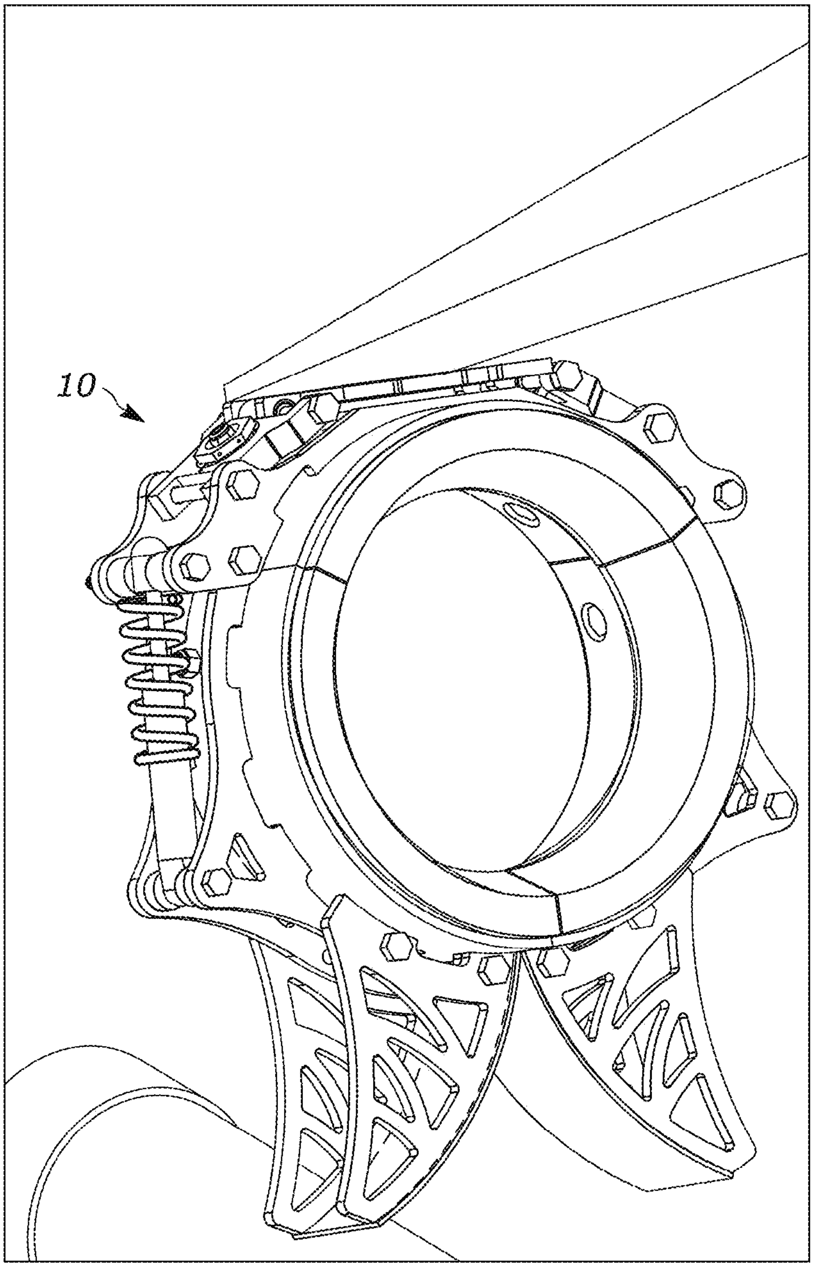
FIGS. 22A-22D illustrates an example process of opening and closing the apparatus of FIG. 1A around a tubular.
Figure 22B:
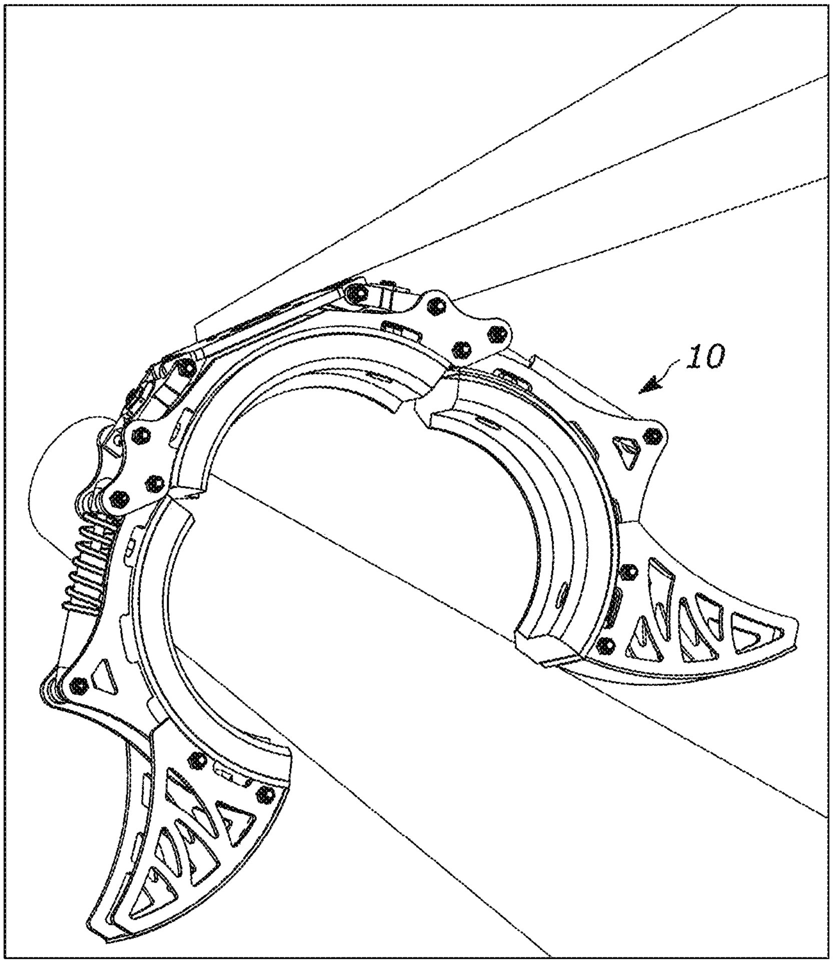
Figure 22C:
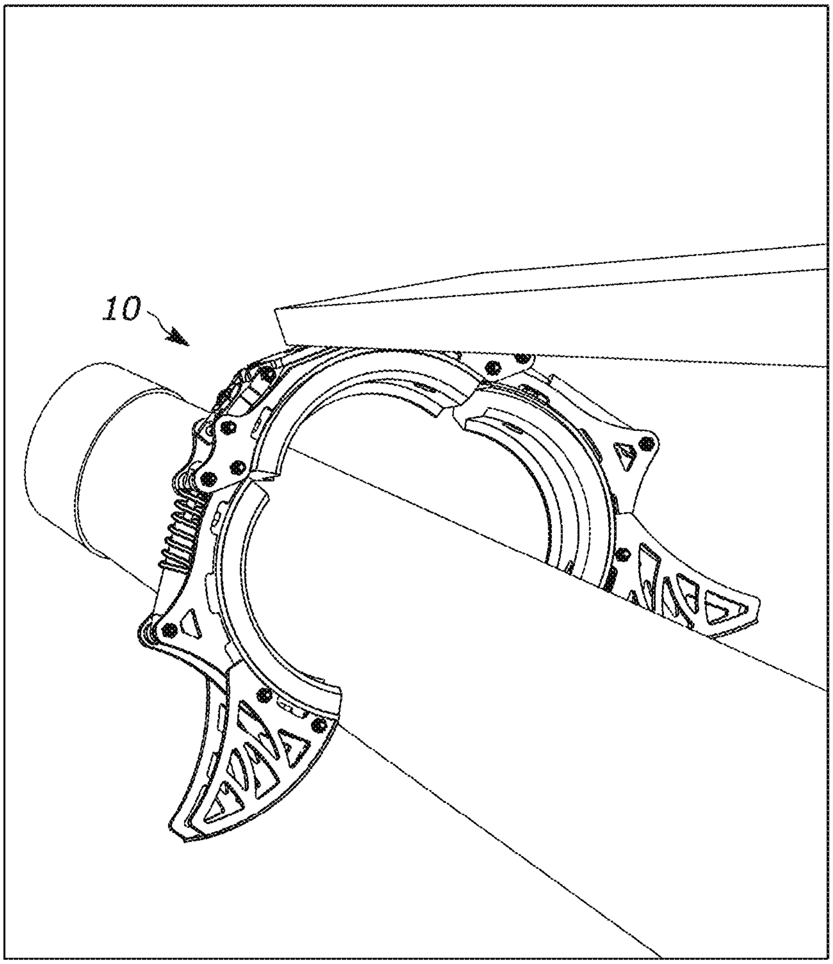
Figure 22D:
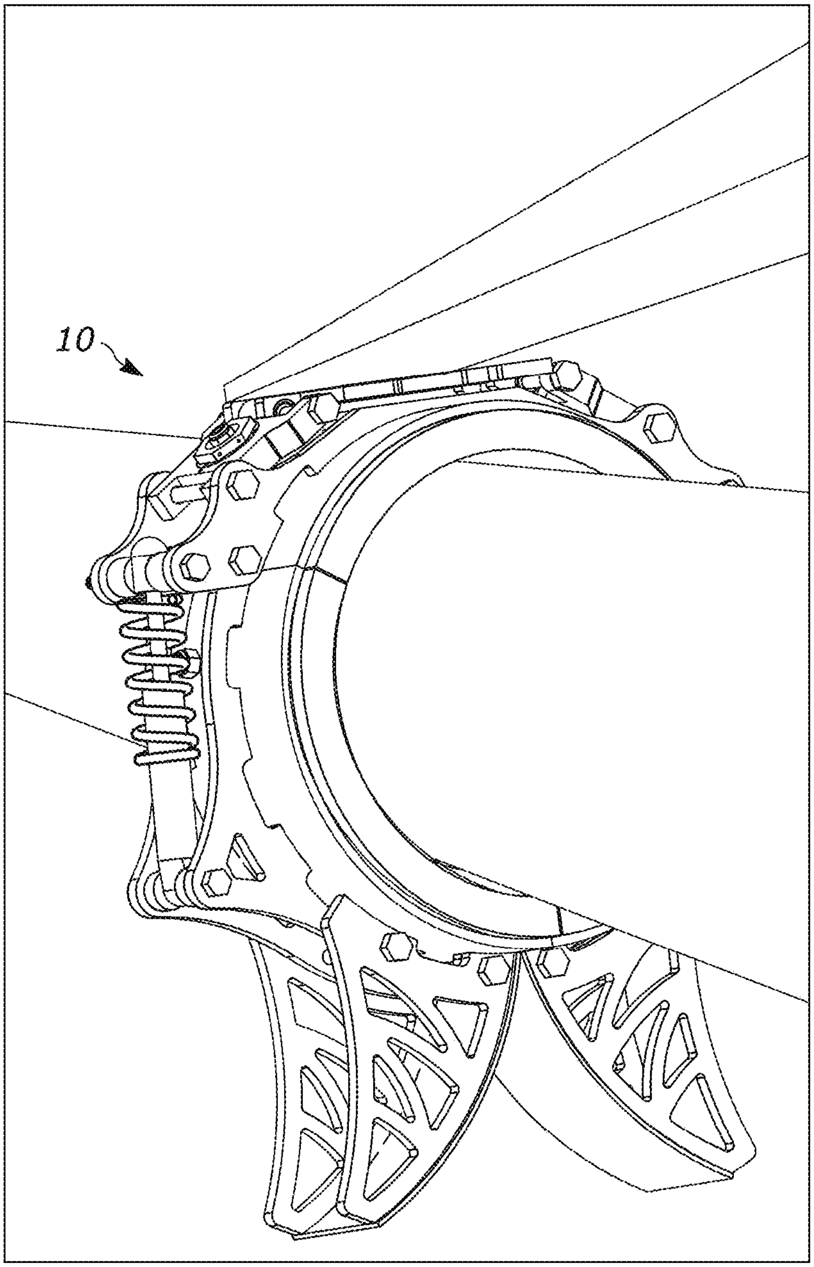

With reference to FIGS. 21A-21C, the robotic tubular stabbing guide 10 may be converted to an open configuration when one or more biasing mechanisms may have force applied via the first shoe assembly 26 and the second shoe assembly 28.

With reference to FIGS. 22A-22D, the robotic tubular stabbing guide 10 may open and close about a tubular. In some embodiments, the robotic tubular stabbing guide 10 may be pressed upon a tubular via a robotic arm.

For example, the robotic arm may connect to the robotic tubular stabbing guide 10 via the mount 12. In some embodiments, the robotic tubular stabbing guide 10 makes contact with the tubular via the first shoe assembly 26 and the second shoe assembly 28, which centers the robotic tubular stabbing guide 10 with the tubular and transfers force from the robotic arm pushing the robotic tubular stabbing guide 10 onto the tubular to the springs 30. In some embodiments, the springs 30 may relent to the force and allow the robotic tubular stabbing guide 10 to convert from a closed configuration and an open configuration. In some embodiments, when converting to the open configuration, the robotic tubular stabbing guide 10 may allow the tubular to slide into the interior cavity of the robotic tubular stabbing guide 10. In some embodiments, when the robotic tubular stabbing guide 10 has been pressed upon the tubular with an amount of force greater than a threshold, and the tubular is aligned with the interior cavity, the robotic tubular stabbing guide 10 may close around the robotic tubular stabbing guide 10 via the springs 30.

Figure 23:
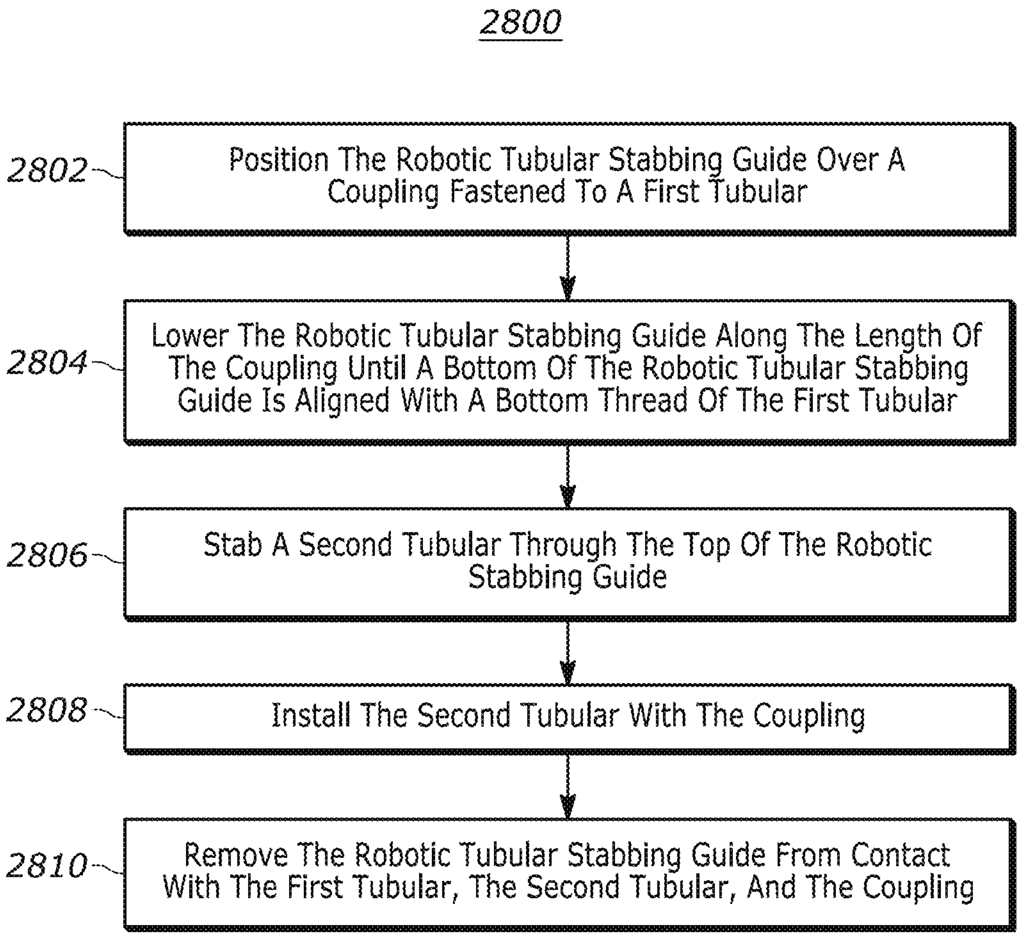
FIG. 23 illustrates an example process for utilizing the apparatus of FIG. 1A to secure a tubular during installation.

FIG. 23 illustrates an example process 2800 for utilizing the robotic tubular stabbing guide 10 to secure a tubular during installation. In some implementations, one or more process blocks of FIG. 23 may be performed by a human operator or one or more processors executing instructions stored on a non-transitory computer-readable storage medium.

As shown in FIG. 23, process 2800 may include positioning the robotic tubular stabbing guide 10 via a robotic arm over a coupling fastened to a first tubular installed in a wellbore (block 2802). For example, a first tubular may be vertically installed in a well bore with a coupling affixed to the top of the first tubular. In some embodiments, the first tubular may be configured for connection via threaded couplings, the tubular having helical grooves or threads cut into the outer surface at one or both ends. In some embodiments, the coupling may have complementary threads cut into the interior for installation with a threaded tubular.

As also shown in FIG. 23, process 2800 may include lowering the robotic tubular stabbing guide 10 along the length of the coupling until a bottom of the robotic tubular stabbing guide 10 is aligned with a bottom thread of the first tubular (block 2804). For example, the robotic tubular stabbing guide 10 may be in a closed configuration with the central cavity centered around the circumference of the coupling where the central cavity is larger than the circumference of the coupling. In some embodiments, the robot arm may lower the robotic tubular stabbing guide 10 so that the coupling is encircled, and the robotic tubular stabbing guide 10 may be lowered along the length of the coupling. In some embodiments, the robotic tubular stabbing guide 10 may be lowered past the coupling to the first tubular and may align the bottom lip of the tri-guide design 40 with the bottommost thread of the first tubular. In some embodiments, the first tubular may have a lip or ring protruding from the surface at the point where the threads start. In some embodiments, the robotic tubular stabbing guide 10 may be lowered until the bottommost point contacts the lip, indicating the start of the threads of the first tubular.

As further shown in FIG. 23, process 2800 may include stabbing a second tubular through the top of the robotic stabbing guide 10, which aligns the second tubular with the coupling (block 2806). In some embodiments, the robotic tubular stabbing guide 10 may have secured the first tubular and the coupling from moving and twisting with the tri-guide design 40 protruding above the top of the coupling for aligning the second tubular with the coupling. For example, a top drive may lower the second tubular onto the coupling and guide the threads of the second coupling into the reciprocal threads inside the coupling via the tri-guide design 40.

As also shown in FIG. 23, process 2800 may include installing the second tubular with the coupling (block 2808). While aligned, the top drive may twist the second tubular into the coupling, creating an airtight seal. In some embodiments, the polyurethane guide holds the pipe in its 360° circumference so that the pin end contacts and slides along the angled wall of the top portion of the polyurethane guide. Thus, the robotic tubular stabbing guide 10 keeps the tubular threads, shoulders, and seals from being damaged.

As further shown in FIG. 23, process 2800 may include removing the robotic tubular stabbing guide 10 from contact with the first tubular, the second tubular, and the coupling (block 2810). For example, the robotic arm may pull the robotic tubular stabbing guide 10 from contact with the first tubular, the second tubular, and the coupling by moving in a direction perpendicular to the alignment of the first tubular. For example, the tubular may be installed vertically into a wellbore, and the robotic tubular stabbing guide 10 may move horizontally. In some embodiments, the robotic tubular stabbing guide 10 may convert from the closed configuration to the open configuration. This step may operate as a reverse of the process described in FIG. 22.

Although FIG. 23 shows example blocks of process 2800, in some implementations, process 2800 may include additional blocks, fewer blocks, different blocks, or differently arranged blocks than those depicted in FIG. 23. Additionally, or alternatively, two or more of the blocks of process 2800 may be performed in parallel.

Figure 24:
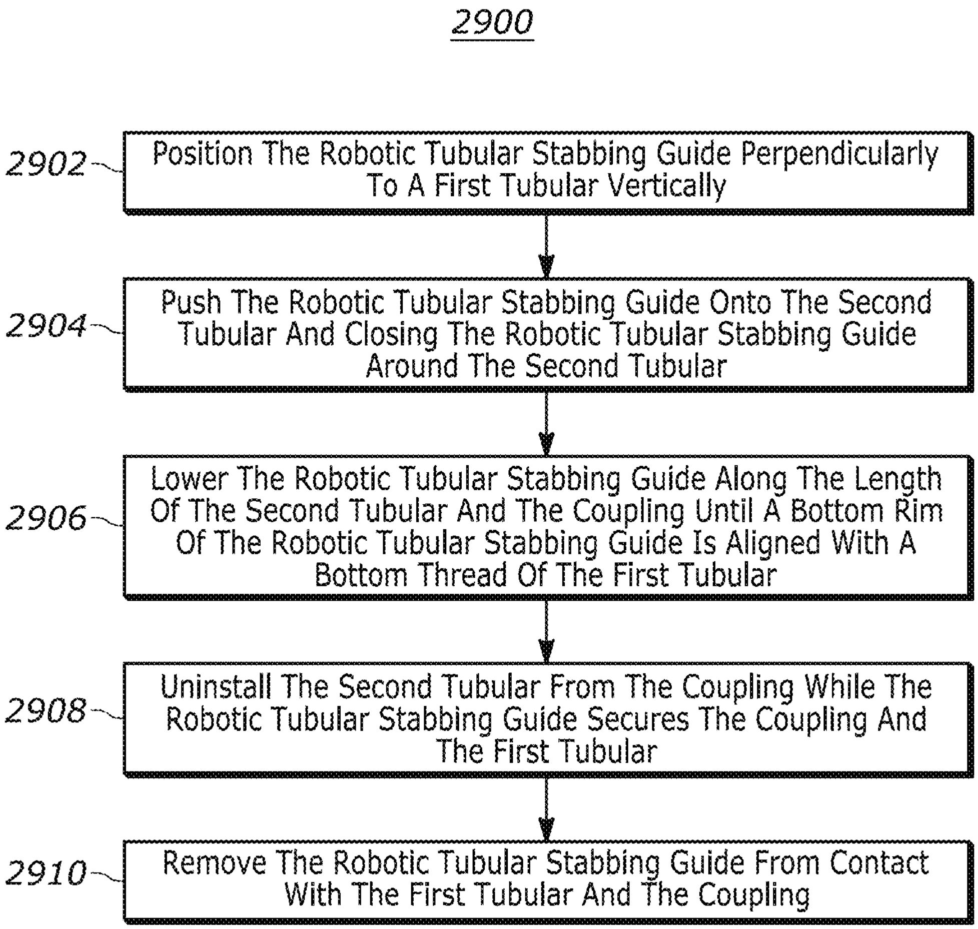
FIG. 24 illustrates an example process for utilizing the apparatus of FIG. 1A to secure a tubular during removal.

FIG. 24 illustrates an example process 2900 for utilizing robotic tubular stabbing guide 10 to secure a tubular during uninstallation. In some implementations, one or more process blocks of FIG. 24 may be performed by a human operator or one or more processors executing instructions stored on a non-transitory computer-readable storage medium.

As shown in FIG. 24, process 2900 may include positioning the robotic tubular stabbing guide 10, via a robotic arm, perpendicularly to a first tubular vertically installed in a well bore, a coupling fixed to the top of the first tubular, and a second tubular fixed to the top of the coupling (block 2902). For example, the robotic tubular stabbing guide 10 may be positioned so that the first shoe assembly 26 and the second shoe assembly 28 are directed to the side of the first tubular. In some embodiments, the process of engaging the robotic tubular stabbing guide 10 with the first tubular may be similar to the process described in FIG. 22.

As also shown in FIG. 24, process 2900 may include pushing the robotic tubular stabbing guide 10 onto the second tubular and closing the robotic tubular stabbing guide around the second tubular (block 2904). In some embodiments, the robotic tubular stabbing guide 10 makes contact with the tubular via the first shoe assembly 26 and the second shoe assembly 28, which center the robotic tubular stabbing guide 10 with the tubular and transfer force from the robotic arm pushing the robotic tubular stabbing guide 10 onto the tubular to the springs 30. In some embodiments, the springs 30 may relent to the force and allow the robotic tubular stabbing guide 10 to convert from a closed configuration and an open configuration. In some embodiments, when converting to the open configuration, the robotic tubular stabbing guide 10 may allow the tubular to slide into the interior cavity of the robotic tubular stabbing guide 10. In some embodiments, when the robotic tubular stabbing guide 10 has been fully pressed upon the tubular, the robotic tubular stabbing guide 10 may close around the robotic tubular stabbing guide 10 via the springs 30, which may cause the robotic tubular stabbing guide 10 to convert back to a closed configuration.

As further shown in FIG. 24, process 2900 may include lowering the robotic tubular stabbing guide 10 along the length of the second tubular and the coupling until a bottom rim of the robotic tubular stabbing guide is aligned with a bottom thread of the first tubular (block 2906). In some embodiments, the robotic tubular stabbing guide 10 may be lowered along the length of the second tubular and the coupling until the first tubular is reached. In some embodiments, the robotic tubular stabbing guide 10 may be lowered past the coupling to the first tubular and may align the bottom lip of the tri-guide design 40 with the bottommost thread of the first tubular. In some embodiments, the tubulars may have a lip or ring protruding from the surface at the point where the threads start. In some embodiments, the robotic tubular stabbing guide 10 may be lowered until the bottommost point contacts the lip, indicating the start of the threads of the first tubular.

As also shown in FIG. 24, process 2900 may include uninstalling the second tubular from the coupling while the robotic tubular stabbing guide 10 secures the coupling and the first tubular (block 2908). While aligned, the top drive may twist the second tubular out of the coupling, while the robotic tubular stabbing guide 10 secures the coupling and first tubular and protects from wear to the threads and surface of the components.

As further shown in FIG. 24, process 2900 may include removing the robotic tubular stabbing guide 10 from contact with the first tubular and the coupling (block 2910). For example, the robotic arm may pull the robotic tubular stabbing guide 10 from contact with the first tubular and the coupling by moving in a direction perpendicular to the alignment of the first tubular. In some embodiments, the robotic tubular stabbing guide 10 may convert from the closed configuration to the open configuration while the tubular is moved out of the cavity and return to a closed configuration when the tubular is fully removed from contact with the robotic tubular stabbing guide 10. This step may operate as a reverse of the process described in FIG. 27.

Although FIG. 24 shows example blocks of process 2900, in some implementations, process 2900 may include additional blocks, fewer blocks, different blocks, or differently arranged blocks than those depicted in FIG. 24. Additionally, or alternatively, two or more of the blocks of process 2900 may be performed in parallel.

Clauses:

Example Clause A: A robotic tubular stabbing guide for oil and gas well application, may include: a mount adapted to connect to a robotic arm; a main body associated with the mount, the main body including: a cylindrical tubular guide including a top portion and a bottom portion; a top portion having an inwardly angled surface relative to an axis passing through a center of the cylindrical guide and a bottom portion having an inner surface colinear to the axis; and a first arm and second arm which are in pivoting association with the main body.

Example Clause B: The robotic tubular stabbing guide of Example Clause A, where the top portion of the cylindrical guide having an inwardly angled surface relative to an axis passing through a center of the cylindrical guide.

Example Clause C: The robotic tubular stabbing guide of Example Clause A or Example Clause B, where the bottom portion of the cylindrical guide having an inner surface colinear to the axis.

Example Clause D: The robotic tubular stabbing guide of any one of Example Clauses A-C, where the first arm and the second arm are biased into a closed position by at least one biasing element.

Example Clause E: The robotic tubular stabbing guide of any one of Example Clauses A-D, where the first arm biases a first section of the cylindrical tubular guide and the second arm biases a second section of the cylindrical tubular guide.

Example Clause F: The robotic tubular stabbing guide of any one of Example Clauses A-E, where the first arm includes a first shoe portion curved and extending outwardly away from the cylindrical tubular guide.

Example Clause G: The robotic tubular stabbing guide of any one of Example Clauses A-F, where the second arm includes a second shoe portion curved and extending outwardly away from the cylindrical tubular guide.

Example Clause H: A method for operating a robotic tubular stabbing guide to install a tubular, the method may include: positioning the robotic tubular stabbing guide, via a robotic arm, over a coupling fastened to a first tubular installed in a well bore; lowering the robotic tubular stabbing guide along the length of the coupling until a bottom of the robotic tubular stabbing guide is aligned with a bottom thread of the first tubular; stabbing a second tubular through the top of the robotic stabbing guide, which aligns the second tubular with the coupling; installing the second tubular with the coupling; and removing the robotic tubular stabbing guide from contact with the first tubular, the second tubular, and the coupling.

Example Clause I: The method of Example Clause H, where the robotic tubular stabbing guide protects the threads of the first tubular while installing the second tubular with the coupling.

Example Clause J: The method of Example Clause H or Example Clause I, further may include removing the robotic tubular stabbing guide by moving the robotic tubular stabbing guide, via the robotic arm, in a direction which is perpendicular with an alignment of the first tubular and the second tubular.

Example Clause K: The method of any one of Example Clauses H-J, where moving the robotic tubular stabbing guide in the direction causes the robotic stabbing guide to convert from a closed position to an open position while in contact with the first tubular, the second tubular, and the coupling.

Example Clause L: The method of any one of Example Clauses H-K, where moving the robotic tubular stabbing guide in the direction until no longer in contact with the first tubular, the second tubular, and the coupling causes the robotic stabbing guide to convert from the open position to the closed position.

Example Clause M: The method of any one of Example Clauses H-L, further may include guiding of the second tubular, an inwardly angled surface on an interior rim of the robotic tubular stabbing guide, where the inwardly angled surface is relative to an axis passing through a center of the robotic tubular stabbing guide.

Example Clause N: The method of any one of Example Clauses H-M, where the robotic tubular stabbing guide is in a closed position, where the closed position is maintained by at least one biasing element.

Example Clause O: A method for operating a robotic tubular stabbing guide to uninstall a tubular, the method may include: positioning the robotic tubular stabbing guide, via a robotic arm, perpendicularly to a first tubular vertically installed in a well bore, a coupling fixed to the top of the first tubular, and a second tubular fixed to the top of the coupling; pushing the robotic tubular stabbing guide onto the second tubular and closing the robotic tubular stabbing guide around the second tubular; lowering the robotic tubular stabbing guide along the length of the second tubular and the coupling until a bottom rim of the robotic tubular stabbing guide is aligned with a bottom thread of the first tubular; uninstalling the second tubular from the coupling while the robotic tubular stabbing guide secures the coupling and the first tubular; and removing the robotic tubular stabbing guide from contact with the first tubular and the coupling.

Example Clause P: The method of Example Clause O, where the robotic tubular stabbing guide protects the threads of the first tubular while uninstalling the second tubular from the coupling.

Example Clause Q: The method of Example Clause O or Example Clause P, where pushing the robotic tubular stabbing guide on the second installed tubular causes the robotic stabbing guide to convert from a closed position to an open position.

Example Clause R: The method of any one of Example Clauses O-Q, where closing the robotic tubular stabbing guide around the second installed tubular, causes the robotic stabbing guide to convert from the open position to the closed position via at least one biasing element.

Example Clause S: The method of any one of Example Clauses O-R, where pushing the robotic tubular stabbing guide onto the second installed tubular further may include a wing of the robotic tubular stabbing guide contacting the second tubular to inform the conversion of the robotic tubular stabbing guide to the open position.

Example Clause T: The method of any one of Example Clauses O-S, where securing the coupling and the first tubular includes preventing any rotation.

It should be appreciated that the robot and components thereof are not a part of the invention and are well known to persons of ordinary skill in the art. The invention and any claims to the invention are not intended to include the robot or any part thereof as a claim element in the claims. The same is true with the casings/pipes which are well known in the prior art and not intended to be a part of the invention or a required claim element in the claims.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A tubular stabbing guide used for installing and removing tubulars in well applications, the tubular stabbing guide, comprising:

a mount adapted to connect to a robotic arm;

a main body associated with the mount;

a cylindrical tubular guide including a bottom portion adapted to encircle a box end of a first tubular, and a top portion adapted to guide a pin end of a second tubular into the box end of the first tubular;

the top portion having an inwardly angled surface relative to a vertical axis passing through a center of the cylindrical tubular guide, wherein the axis is colinear with a length of the first tubular, wherein the bottom portion has an inner surface colinear to the axis, wherein the inwardly angled surface is adapted to guide the pin end of the second tubular into the box end of the first tubular;

a first arm which pivots in association with a first point of the main body and a second arm which pivots in association with a second point of the main body, wherein the first arm, the second arm, and the main body form a tri-guide of the cylindrical tubular guide, wherein the first arm and second arm are adapted to open and close the cylindrical tubular guide around the tubulars; and a first shoe portion of the first arm, wherein the first shoe portion is fixed on the first arm via a first bolt, curved and extends outwardly away from the cylindrical tubular guide, and a second shoe portion of the second arm, wherein the second shoe portion is fixed on the second arm via a second bolt, curved and extends outwardly away from the cylindrical tubular guide, wherein pressing the first shoe portion and the second shoe portion against one of the tubulars causes the first arm and the second arm to spread apart.

2. The tubular stabbing guide of claim 1, wherein the first arm and the second arm are biased into a closed position by at least one biasing element.

3. The tubular stabbing guide of claim 2, wherein the first arm biases a first section of the cylindrical tubular guide and the second arm biases a second section of the cylindrical tubular guide.

4. The tubular stabbing guide of claim 1, wherein the first shoe portion and the second shoe portion are curved in three dimensions, wherein the tubular stabbing guide can be pressed onto the tubulars at angles different than perpendicular to the axis.

5. A method for operating a tubular stabbing guide to install tubulars, the method comprising:

positioning the tubular stabbing guide, via a robotic arm onto a box end of a first tubular, wherein the box end of the first tubular is protruding from a well bore, wherein the tubular stabbing guide comprises:

a main body associated with the robotic arm;

a cylindrical tubular guide including a bottom portion adapted to encircle the box end of the first tubular, and a top portion adapted to guide a pin end of a second tubular into the box end of the first tubular, the top portion having an inwardly angled surface relative to a vertical axis passing through a center of the cylindrical tubular guide wherein the axis is colinear with a length of the first tubular, wherein the bottom portion has an inner surface colinear to the axis;

a first arm which pivots in association with a first point of the main body and a second arm which pivots in association with a second point of the main body, wherein the first arm, the second arm, and the main body form a tri-guide of the cylindrical tubular guide, wherein the first arm and second arm are adapted to open and close the cylindrical tubular guide around the tubulars, wherein the first arm and the second arm are biased into a closed position;

a first shoe portion of the first arm, wherein the first shoe portion is fixed on the first arm via a first bolt, curved and extends outwardly away from the cylindrical tubular guide, and a second shoe portion of the second arm, wherein the second shoe portion is fixed on the second arm via a second bolt, curved and extends outwardly away from the cylindrical tubular guide, wherein pressing the first shoe portion and the second shoe portion against one of the tubulars causes the first arm and the second arm to spread apart;

stabbing a pin end of a second tubular through the top portion of the cylindrical tubular guide, which aligns the second tubular with the box end of the first tubular;

coupling the second tubular with the first tubular; and removing the tubular stabbing guide from the first tubular and the coupling by actuating the robotic arm in a direction away from the axis, wherein the first arm and the second arm are spread apart in opposition to being biased into the closed position.

6. The method of claim 5, wherein the tubular stabbing guide directs the threads of the pin end of the second tubular into alignment with the box end of the first tubular, wherein misalignment of the coupling is prevented.

7. The method of claim 5, further comprising removing the tubular stabbing guide by moving the tubular stabbing guide, via the robotic arm, in a direction which is perpendicular with an alignment of the first tubular and the second tubular.

8. The method of claim 7, wherein moving the tubular stabbing guide in the direction causes the stabbing guide to initiate conversion from a closed position to an open position while in contact with the first tubular, the second tubular, and the coupling.

9. The method of claim 8, wherein moving the tubular stabbing guide in the direction until no longer in contact with the first tubular, the second tubular, and the coupling causes the stabbing guide to convert from the open position to the closed position.

10. The method of claim 5, wherein the tubular stabbing guide is in a closed position, wherein the closed position is maintained by at least one biasing element.

11. A method for operating a tubular stabbing guide to uninstall tubulars, the method comprising:

positioning the tubular stabbing guide, via a robotic arm, proximate to a coupling of a first tubular protruding from a well bore, and a second tubular coupled to the first tubular, wherein the tubular stabbing guide comprises:

a main body associated with the robotic arm;

a cylindrical tubular guide including a bottom portion adapted to encircle the box end of the first tubular, and a top portion adapted to guide a pin end of the second tubular into the box end of the first tubular, the top portion having an inwardly angled surface relative to a vertical axis passing through a center of the cylindrical tubular guide wherein the axis is colinear with a length of the first tubular, wherein the bottom portion has an inner surface colinear to the axis;

a first arm which pivots in association with a first point of the main body and a second arm which pivots in association with a second point of the main body, wherein the first arm, the second arm, and the main body form a tri-guide of the cylindrical tubular guide, wherein the first arm and second arm are adapted to open and close the cylindrical tubular guide around the tubulars, wherein the first arm and the second arm are biased into a closed position;

a first shoe portion of the first arm, wherein the first shoe portion is fixed on the first arm via a first bolt, curved and extends outwardly away from the cylindrical tubular guide, and a second shoe portion of the second arm, wherein the second shoe portion is fixed on the second arm via a second bolt, curved and extends outwardly away from the cylindrical tubular guide, wherein pressing the first shoe portion and the second shoe portion against one of the tubulars causes the first arm and the second arm to spread apart;

pushing the first shoe portion and the second shoe portion of the tubular stabbing guide, via the robotic arm, onto the second tubular proximate the coupling with the first tubular, wherein the first arm and the second arm spread apart to encircle the second tubular with the cylindrical tubular guide;

lowering the tubular stabbing guide along the length of the second tubular until the bottom portion of the cylindrical tubular guide rests on the box end of the first tubular;

uncoupling the second tubular from the first tubular while the tubular stabbing guide secures the first tubular; and removing the tubular stabbing guide via the robotic arm from contact with the first tubular.

12. The method of claim 11, wherein the pushing of the tubular stabbing guide onto the second tubular causes the cylindrical tubular guide of the tubular stabbing guide to convert from a closed position to an open position.

13. The method of claim 1 wherein closing the tubular stabbing guide around the second tubular, causes the tubular stabbing guide to convert from the open position to the closed position via at least one biasing element.

14. The tubular stabbing guide of claim 11, wherein the first shoe portion and the second shoe portion are curved in three dimensions, wherein the tubular stabbing guide can be pressed onto the tubulars at angles different than perpendicular to the axis.

* * * * *